(12) United States Patent
Tsai et al.

(10) Patent No.: US 8,508,859 B2
(45) Date of Patent: Aug. 13, 2013

(54) IMAGE PICKUP OPTICAL LENS ASSEMBLY

(75) Inventors: Tsung-Han Tsai, Taichung (TW); Ming-Ta Chou, Taichung (TW)

(73) Assignee: Largan Precision Co., Taichung (*) Notice: Subject to any disclaimer, the term of this patent is extended or adjusted under 35 U.S.C. 154(b) by 104 days.

(21) Appl. No.: 13/170,507

(22) Filed: Jun. 28, 2011

(65) Prior Publication Data
US 2012/0188655 A1 Jul. 26, 2012

(30) Foreign Application Priority Data
Jan. 20, 2011 (TW) .............................. 100102190 A

(51) Int. Cl.
*G02B 3/02* (2006.01)
*G02B 13/18* (2006.01)

(52) U.S. Cl.
USPC ........................... 359/714; 359/708; 359/713

(58) Field of Classification Search
USPC .......... 359/708, 713, 714, 754–758, 763–766
See application file for complete search history.

(56) References Cited

U.S. PATENT DOCUMENTS

| | | | |
|---|---|---|---|
| 7,502,181 B2 | 3/2009 | Shinohara | |
| 7,710,665 B2 | 5/2010 | Park et al. | |
| 7,826,151 B2 * | 11/2010 | Tsai | 359/764 |
| 7,864,454 B1 * | 1/2011 | Tang et al. | 359/764 |
| 2008/0094709 A1 * | 4/2008 | Iwasawa | 359/557 |
| 2010/0253829 A1 | 10/2010 | Shinohara | |
| 2010/0254029 A1 | 10/2010 | Shinohara | |
| 2011/0043930 A1 * | 2/2011 | Kwon | 359/714 |

FOREIGN PATENT DOCUMENTS

| | | |
|---|---|---|
| JP | 2005015521 A | 1/2005 |
| JP | 2006293042 A | 10/2006 |
| TW | M332199 | 5/2008 |
| TW | I329755 | 9/2010 |
| TW | 201038966 | 11/2010 |

* cited by examiner

*Primary Examiner* — Thomas K Pham
*Assistant Examiner* — Sharrief Broome
(74) *Attorney, Agent, or Firm* — Wang Law Firm, Inc.; Li K. Wang; Stephen Hsu

(57) ABSTRACT

An image pick-up optical lens assembly, sequentially arranged from an object side to an image side along an optical axis, comprises: a first lens element with a positive refractive power having a convex object-side surface, a second lens element with a negative refractive power, a third lens element with a positive refractive power, a meniscus fourth lens element with a positive refractive power having at least one aspherical optical surface, and a fifth lens element with a positive refractive power having at least one inflection point on the optical image-side surface. Additionally, the image pick-up optical lens assembly satisfies several particular conditions. The invention possesses features such as good aberration compensation, well-performed modulation transfer function and short total length of lens assembly applicable for compact cameras and mobile phones.

24 Claims, 33 Drawing Sheets

Table 1
(First Preferred Embodiment)
f = 3.82 mm, Fno = 2.60, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.123830 (ASP) | 0.454 | Plastic | 1.544 | 55.9 | 2.91 |
| 2 | | -5.776800 (ASP) | -0.054 | | | | |
| 3 | Ape. Stop | Plano | 0.248 | | | | |
| 4 | Lens 2 | -18.587400 (ASP) | 0.262 | Plastic | 1.634 | 23.8 | -4.19 |
| 5 | | 3.113400 (ASP) | 0.255 | | | | |
| 6 | Lens 3 | 3.194100 (ASP) | 0.340 | Plastic | 1.544 | 55.9 | 59.29 |
| 7 | | 3.412100 (ASP) | 0.430 | | | | |
| 8 | Lens 4 | -1.471530 (ASP) | 0.492 | Plastic | 1.544 | 55.9 | 11.03 |
| 9 | | -1.321140 (ASP) | 0.073 | | | | |
| 10 | Lens 5 | 1.381240 (ASP) | 0.687 | Plastic | 1.530 | 55.8 | 33.52 |
| 11 | | 1.239650 (ASP) | 0.800 | | | | |
| 12 | IR-filter | Plano | 0.300 | Glass | 1.516 | 64.1 | - |
| 13 | | Plano | 0.710 | | | | |
| 14 | Image | Plano | - | | | | |

Note: Reference wavelength is equal to d-line 587.5nm, and ASP stands for aspherical surface

FIG. 9

Table 2
Aspheric Coefficients

| Surface # | 1 | 2 | 4 | 5 | 6 |
|---|---|---|---|---|---|
| k = | -9.85089E-01 | 1.43813E+01 | -1.00000E+00 | -1.08522E+01 | -4.76117E+00 |
| A4 = | -4.60520E-02 | -4.30400E-02 | 5.03724E-02 | 1.98610E-02 | -1.98047E-01 |
| A6 = | 2.07952E-02 | 8.93533E-03 | 1.59854E-01 | 2.79877E-01 | 1.20795E-01 |
| A8 = | -2.71502E-01 | -1.70201E-01 | -4.05031E-01 | -4.74407E-01 | -1.98296E-01 |
| A10 = | 3.34957E-01 | 7.27495E-02 | 3.00269E-01 | 2.38374E-01 | 3.50052E-01 |
| A12 = | -2.64680E-01 | | | | -3.02147E-01 |
| A14 = | | | | | 4.19305E-02 |
| A16 = | | | | | -2.45757E-02 |

| Surface # | 7 | 8 | 9 | 10 | 11 |
|---|---|---|---|---|---|
| k = | 2.12269E+00 | -2.31024E+00 | -6.15616E-01 | -2.60543E+00 | -3.23648E+00 |
| A4 = | -6.81336E-02 | 2.84592E-01 | 1.02560E-01 | -1.36150E-01 | -9.68177E-02 |
| A6 = | -1.18407E-01 | -2.54536E-01 | -2.82542E-02 | 4.15656E-02 | 3.03232E-02 |
| A8 = | 1.44346E-01 | 4.47238E-02 | 1.26017E-02 | -6.25747E-03 | -8.21928E-03 |
| A10 = | -7.84496E-02 | 6.93047E-02 | -5.79949E-04 | 3.75227E-04 | 1.48711E-03 |
| A12 = | | -4.44719E-02 | -3.59600E-05 | | -1.59679E-04 |
| A14 = | | | | | 7.02283E-06 |

FIG. 10

Table 3
(Second Preferred Embodiment)
f = 3.96 mm, Fno = 2.60, HFOV = 35.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.116 | | | | |
| 2 | Lens 1 | 1.940780 (ASP) | 0.454 | Plastic | 1.544 | 55.9 | 3.65 |
| 3 | | 74.605200 (ASP) | 0.250 | | | | |
| 4 | Lens 2 | 18.768000 (ASP) | 0.252 | Plastic | 1.650 | 21.4 | -5.63 |
| 5 | | 3.046800 (ASP) | 0.236 | | | | |
| 6 | Lens 3 | 2.480030 (ASP) | 0.334 | Plastic | 1.544 | 55.9 | 61.51 |
| 7 | | 2.551370 (ASP) | 0.457 | | | | |
| 8 | Lens 4 | -1.419880 (ASP) | 0.518 | Plastic | 1.544 | 55.9 | 9.22 |
| 9 | | -1.248940 (ASP) | 0.106 | | | | |
| 10 | Lens 5 | 1.410730 (ASP) | 0.671 | Plastic | 1.530 | 55.8 | 34.75 |
| 11 | | 1.276040 (ASP) | 0.800 | | | | |
| 12 | IR-filter | Plano | 0.300 | Glass | 1.516 | 64.1 | - |
| 13 | | Plano | 0.830 | | | | |
| 14 | Image | Plano | - | | | | |

Note: Reference wavelength is equal to d-line 587.5nm, and ASP stands for aspherical surface

FIG. 11

Table 4
Aspheric Coefficients

| Surface # | 2 | 3 | 4 | 5 | 6 |
|---|---|---|---|---|---|
| k = | 7.68438E-01 | 1.43813E+01 | -1.00000E+00 | -1.98937E+01 | -6.32086E+00 |
| A4 = | -3.10221E-02 | -4.10836E-02 | -5.00205E-02 | -1.80375E-02 | -1.94761E-01 |
| A6 = | 1.40500E-02 | -4.82355E-02 | 1.69313E-01 | 2.50558E-01 | 1.22371E-01 |
| A8 = | -2.13474E-01 | -7.06615E-02 | -4.82371E-01 | -4.25312E-01 | -2.06836E-01 |
| A10 = | 3.15574E-01 | -3.40207E-03 | 3.28400E-01 | 1.83712E-01 | 3.59966E-01 |
| A12 = | -2.64314E-01 | | | | -3.02466E-01 |
| A14 = | | | | | 4.17054E-02 |
| A16 = | | | | | -2.44808E-02 |

| Surface # | 7 | 8 | 9 | 10 | 11 |
|---|---|---|---|---|---|
| k = | 8.44992E-01 | -1.03145E+00 | -6.04282E-01 | -2.35742E+00 | -3.44439E+00 |
| A4 = | -9.11988E-02 | 2.87650E-01 | 9.00038E-02 | -1.28005E-01 | -8.96497E-02 |
| A6 = | -1.10501E-01 | -2.18857E-01 | -3.18855E-02 | 3.93339E-02 | 2.70914E-02 |
| A8 = | 1.51195E-01 | 2.79604E-02 | 1.72088E-02 | -6.42154E-03 | -7.57435E-03 |
| A10 = | -7.55790E-02 | 7.47077E-02 | 3.20418E-04 | 4.24072E-04 | 1.46836E-03 |
| A12 = | | -4.04444E-02 | -1.337787E-04 | | -1.71321E-04 |
| A14 = | | | | | 8.18392E-06 |

FIG. 12

Table 5
(Third Preferred Embodiment)
f = 4.38 mm, Fno = 2.40, HFOV = 32.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.916480 (ASP) | 0.621 | Plastic | 1.544 | 55.9 | 2.95 |
| 2 | | -8.781700 (ASP) | -0.065 | | | | |
| 3 | Ape. Stop | Plano | 0.181 | | | | |
| 4 | Lens 2 | 4.995900 (ASP) | 0.273 | Plastic | 1.632 | 23.4 | -4.59 |
| 5 | | 1.796970 (ASP) | 0.786 | | | | |
| 6 | Lens 3 | -2.034450 (ASP) | 0.341 | Plastic | 1.632 | 23.4 | 121.36 |
| 7 | | -2.110520 (ASP) | 0.050 | | | | |
| 8 | Lens 4 | 2.985390 (ASP) | 0.599 | Plastic | 1.544 | 55.9 | 61.22 |
| 9 | | 3.047400 (ASP) | 0.414 | | | | |
| 10 | Lens 5 | 1.255460 (ASP) | 0.400 | Plastic | 1.544 | 55.9 | 28.29 |
| 11 | | 1.213480 (ASP) | 0.700 | | | | |
| 12 | IR-filter | Plano | 0.300 | Glass | 1.516 | 64.1 | - |
| 13 | | Plano | 0.604 | | | | |
| 14 | Image | Plano | - | | | | |

Note: Reference wavelength is equal to d-line 587.5nm, and ASP stands for aspherical surface

FIG. 13

Table 6
Aspheric Coefficients

| Surface # | 1 | 2 | 4 | 5 | 6 |
|---|---|---|---|---|---|
| k = | -6.33125E-01 | -2.00000E+01 | -2.89662E+00 | -1.17031E+00 | -2.52553E+00 |
| A4 = | -9.25552E-03 | -3.45696E-02 | -2.70218E-02 | 1.19966E-02 | -9.01895E-04 |
| A6 = | -2.92846E-02 | -1.58766E-02 | 2.80459E-02 | 2.14098E-02 | 6.82248E-03 |
| A8 = | 4.28645E-03 | -9.00424E-03 | 1.69261E-02 | 6.75656E-02 | 4.25173E-02 |
| A10 = | -1.53331E-02 | -1.96297E-02 | -4.24882E-02 | -9.86327E-02 | -2.80772E-02 |
| A12 = | -8.87437E-03 | 1.27328E-02 | 3.64648E-02 | 5.77666E-02 | 6.00983E-03 |
| A14 = | -5.48645E-04 | -9.32590E-08 | 4.21196E-07 | -5.39412E-07 | -3.12664E-04 |

| Surface # | 7 | 8 | 9 | 10 | 11 |
|---|---|---|---|---|---|
| k = | 7.91745E-01 | -4.71351E+00 | 3.92642E-01 | -3.42516E+00 | -3.29760E+00 |
| A4 = | -1.46913E-02 | -3.55921E-02 | -5.81507E-02 | -7.48389E-02 | -6.96656E-02 |
| A6 = | 5.35272E-02 | 6.31895E-03 | 5.00805E-03 | 6.20978E-03 | 9.06120E-03 |
| A8 = | -1.07603E-03 | 1.09904E-03 | 1.01879E-04 | 8.93747E-04 | -4.89060E-04 |
| A10 = | 3.30884E-03 | -4.05084E-04 | -1.79252E-05 | -1.11791E-04 | -6.22565E-05 |
| A12 = | -9.45675E-04 | 3.37120E-05 | -1.69547E-05 | 3.27091E-07 | 1.09208E-05 |
| A14 = | -5.48645E-04 | -1.13501E-06 | -1.96617E-07 | -3.19570E-07 | 3.68596E-07 |

FIG. 14

Table 7

(Fourth Preferred Embodiment)
f = 4.63 mm, Fno = 2.80, HFOV = 31.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.683530 (ASP) | 0.546 | Plastic | 1.544 | 55.9 | 3.30 |
| 2 | | 23.364500 (ASP) | 0.030 | | | | |
| 3 | Ape. Stop | Plano | 0.040 | | | | |
| 4 | Lens 2 | 2.644400 (ASP) | 0.266 | Plastic | 1.634 | 23.8 | -5.60 |
| 5 | | 1.456450 (ASP) | 0.978 | | | | |
| 6 | Lens 3 | -2.021740 (ASP) | 0.401 | Plastic | 1.544 | 55.9 | 59.95 |
| 7 | | -2.036820 (ASP) | 0.050 | | | | |
| 8 | Lens 4 | 3.031000 (ASP) | 0.639 | Plastic | 1.544 | 55.9 | 84.63 |
| 9 | | 3.003500 (ASP) | 0.514 | | | | |
| 10 | Lens 5 | 1.534540 (ASP) | 0.484 | Plastic | 1.544 | 55.9 | 69.39 |
| 11 | | 1.421760 (ASP) | 0.700 | | | | |
| 12 | IR-filter | Plano | 0.300 | Glass | 1.516 | 64.1 | - |
| 13 | | Plano | 0.456 | | | | |
| 14 | Image | Plano | - | | | | |

Note: Reference wavelength is equal to d-line 587.5nm, and ASP stands for aspherical surface

FIG. 15

Table 8
Aspheric Coefficients

| Surface # | 1 | 2 | 4 | 5 | 6 |
|---|---|---|---|---|---|
| k = | -1.11475E-01 | -2.00000E+01 | -6.16774E+00 | -1.37594E+00 | -1.69259E+00 |
| A4 = | 3.24765E-03 | -2.89138E-02 | -3.74333E-02 | 7.62404E-03 | -1.16524E-02 |
| A6 = | -1.53648E-02 | 4.36081E-03 | 2.19100E-02 | 2.37511E-02 | -7.18733E-03 |
| A8 = | 1.09320E-02 | -3.47445E-04 | 1.02596E-02 | 6.76864E-02 | 3.79727E-02 |
| A10 = | -4.58118E-03 | -2.75952E-02 | -4.34934E-02 | -9.90703E-02 | -2.51438E-02 |
| A12 = | -1.63033E-02 | 1.89451E-03 | 1.80039E-02 | 7.03955E-02 | 1.01323E-02 |
| A14 = | | 1.47996E-03 | 1.19353E-02 | -1.09398E-02 | -1.02567E-03 |

| Surface # | 7 | 8 | 9 | 10 | 11 |
|---|---|---|---|---|---|
| k = | 6.17049E-01 | -8.67737E+00 | 5.87110E-01 | -4.14229E+00 | -3.79975E+00 |
| A4 = | -3.70019E-02 | -3.35011E-02 | -6.96253E-02 | -7.64211E-02 | -6.83344E-02 |
| A6 = | 4.40626E-02 | 6.28201E-03 | 5.32091E-03 | 6.47570E-03 | 9.62896E-03 |
| A8 = | -1.47808E-03 | 1.09635E-03 | 1.62852E-04 | 9.09131E-04 | -3.61482E-04 |
| A10 = | 3.58356E-03 | -3.93148E-04 | -1.38075E-05 | -1.12287E-04 | -5.90215E-05 |
| A12 = | -6.84105E-04 | 3.84780E-05 | -1.43967E-05 | -4.11882E-09 | 8.47216E-06 |
| A14 = | -7.35091E-05 | -9.42284E-07 | 7.97201E-07 | -6.34467E-07 | -2.66489E-07 |

FIG. 16

Table 9
(Fifth Preferred Embodiment)
f = 4.12 mm, Fno = 2.52, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.224 | | | | |
| 2 | Lens 1 | 1.388230 (ASP) | 0.532 | Plastic | 1.544 | 55.9 | 3.06 |
| 3 | | 7.181300 (ASP) | 0.085 | | | | |
| 4 | Lens 2 | -15.793100 (ASP) | 0.252 | Plastic | 1.634 | 23.8 | -5.58 |
| 5 | | 4.772600 (ASP) | 0.266 | | | | |
| 6 | Lens 3 | 2.567990 (ASP) | 0.295 | Plastic | 1.544 | 55.9 | 44.38 |
| 7 | | 2.701030 (ASP) | 0.577 | | | | |
| 8 | Lens 4 | -1.106020 (ASP) | 0.404 | Plastic | 1.544 | 55.9 | 43.21 |
| 9 | | -1.192300 (ASP) | 0.070 | | | | |
| 10 | Lens 5 | 1.625970 (ASP) | 0.661 | Plastic | 1.530 | 55.8 | 30.82 |
| 11 | | 1.551450 (ASP) | 0.800 | | | | |
| 12 | IR-filter | Plano | 0.300 | Glass | 1.516 | 64.1 | - |
| 13 | | Plano | 0.661 | | | | |
| 14 | Image | Plano | - | | | | |

Note: Reference wavelength is equal to d-line 587.5nm, and ASP stands for aspherical surface

FIG. 17

Table 10
Aspheric Coefficients

| Surface # | 2 | 3 | 4 | 5 | 6 |
|---|---|---|---|---|---|
| k = | 4.57144E-01 | 1.43813E+01 | -1.00000E+00 | -2.00000E+01 | 5.34662E-01 |
| A4 = | -3.66950E-02 | -1.06850E-01 | -1.67181E-03 | 7.41608E-02 | -1.71963E-01 |
| A6 = | 2.09912E-02 | -5.98118E-04 | 2.29208E-01 | 3.38347E-01 | 1.74480E-04 |
| A8 = | -2.19655E-01 | -2.85455E-03 | -2.75499E-01 | -3.97501E-01 | -1.65725E-01 |
| A10 = | 2.94627E-01 | -7.03165E-02 | 1.69502E-01 | 3.03503E-01 | 3.36356E-01 |
| A12 = | -2.64314E-01 | | | | -3.02466E-01 |
| A14 = | | | | | 4.17054E-02 |
| A16 = | | | | | -2.44808E-02 |

| Surface # | 7 | 8 | 9 | 10 | 11 |
|---|---|---|---|---|---|
| k = | 1.94238E+00 | -7.16742E-01 | -6.64733E-01 | -5.58599E+00 | -5.26669E+00 |
| A4 = | -8.94576E-02 | 2.79444E-01 | 9.49853E-02 | -9.14156E-02 | -7.66013E-02 |
| A6 = | -1.26967E-01 | -2.00442E-01 | -2.16616E-02 | 3.59436E-02 | 2.45734E-02 |
| A8 = | 1.23318E-01 | 2.31920E-02 | 2.23952E-02 | -6.88915E-03 | -7.02162E-03 |
| A10 = | -7.17998E-02 | 8.99367E-02 | -3.25175E-03 | 4.70810E-04 | 1.45717E-03 |
| A12 = | | -5.75036E-02 | -1.13292E-03 | | -1.90834E-04 |
| A14 = | | | | | 9.95123E-06 |

FIG. 18

Table 11
(Sixth Preferred Embodiment)
f = 3.87 mm, Fno = 2.55, HFOV = 35.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.208 | | | | |
| 2 | Lens 1 | 1.434270 (ASP) | 0.511 | Plastic | 1.544 | 55.9 | 2.81 |
| 3 | | 19.996000 (ASP) | 0.171 | | | | |
| 4 | Lens 2 | -13.793100 (ASP) | 0.252 | Plastic | 1.632 | 23.4 | -4.11 |
| 5 | | 3.219700 (ASP) | 0.265 | | | | |
| 6 | Lens 3 | 13.157900 (ASP) | 0.342 | Plastic | 1.632 | 23.4 | 12.60 |
| 7 | | -19.960100 (ASP) | 0.280 | | | | |
| 8 | Lens 4 | -1.171940 (ASP) | 0.453 | Plastic | 1.544 | 55.9 | 107.75 |
| 9 | | -1.305480 (ASP) | 0.103 | | | | |
| 10 | Lens 5 | 1.562100 (ASP) | 0.729 | Plastic | 1.530 | 55.8 | 28.96 |
| 11 | | 1.457970 (ASP) | 0.700 | | | | |
| 12 | IR-filter | Plano | 0.300 | Glass | 1.516 | 64.1 | - |
| 13 | | Plano | 0.732 | | | | |
| 14 | Image | Plano | - | | | | |

Note: Reference wavelength is equal to d-line 587.5nm, and ASP stands for aspherical surface

FIG. 19

Table 12
Asphcric Coefficients

| Surface # | 2 | 3 | 4 | 5 | 6 |
|---|---|---|---|---|---|
| k = | 6.16080E-01 | 1.43813E+01 | -1.00000E+00 | 1.95129E+00 | -1.00000E+00 |
| A4 = | -1.36541E-02 | 1.43272E-02 | -2.54526E-02 | -1.22332E-02 | -7.26565E-02 |
| A6 = | 3.45036E-02 | -1.53894E-02 | 4.24684E-02 | 1.85433E-01 | -3.48732E-02 |
| A8 = | -9.68745E-02 | -2.02224E-02 | -4.55470E-01 | -5.23403E-01 | -1.28351E-02 |
| A10 = | 2.12463E-01 | -3.33097E-01 | 7.16126E-02 | 3.49511E-01 | 2.25611E-01 |
| A12 = | -2.90404E-01 | | | | -3.09366E-01 |
| A14 = | | | | | 2.84966E-02 |
| A16 = | | | | | -3.15795E-02 |

| Surface # | 7 | 8 | 9 | 10 | 11 |
|---|---|---|---|---|---|
| k = | -1.00000E+00 | -1.87610E+00 | -7.98132E-01 | -4.09157E+00 | -3.96159E+00 |
| A4 = | 3.51689E-02 | 3.49548E-01 | 1.18811E-01 | -1.25040E-01 | -9.24419E-02 |
| A6 = | -1.21278E-01 | -2.57121E-01 | -1.63370E-02 | 3.89996E-02 | 2.91583E-02 |
| A8 = | 9.62284E-02 | 2.67494E-02 | 1.74283E-02 | -5.77162E-03 | -8.28585E-03 |
| A10 = | -2.27665E-02 | 9.20316E-02 | -2.56054E-03 | 3.43337E-04 | 1.52169E-03 |
| A12 = | | -3.85699E-02 | -1.18194E-03 | | -1.62886E-04 |
| A14 = | | | | | 7.02058E-06 |

FIG. 20

Table 13
(Seventh Preferred Embodiment)
f = 3.98 mm, Fno = 2.55, HFOV = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.225 | | | | |
| 2 | Lens 1 | 1.369320 (ASP) | 0.440 | Glass | 1.567 | 42.8 | 2.49 |
| 3 | | 39.370100 (ASP) | 0.085 | | | | |
| 4 | Lens 2 | -9.941100 (ASP) | 0.170 | Plastic | 1.632 | 23.4 | -3.70 |
| 5 | | 3.072600 (ASP) | 0.352 | | | | |
| 6 | Lens 3 | 10.000000 (ASP) | 0.499 | Plastic | 1.632 | 23.4 | 23.57 |
| 7 | | 29.848400 (ASP) | 0.316 | | | | |
| 8 | Lens 4 | -1.320960 (ASP) | 0.468 | Plastic | 1.544 | 55.9 | 50.31 |
| 9 | | -1.417480 (ASP) | 0.244 | | | | |
| 10 | Lens 5 | 1.244230 (ASP) | 0.519 | Plastic | 1.530 | 55.8 | 29.82 |
| 11 | | 1.155430 (ASP) | 0.800 | | | | |
| 12 | IR-filter | Plano | 0.300 | Glass | 1.516 | 64.1 | |
| 13 | | Plano | 0.713 | | | | |
| 14 | Image | Plano | - | | | | |

Note: Reference wavelength is equal to d-line 587.5nm, and ASP stands for aspherical surface

FIG. 21

Table 14
Aspheric Coefficients

| Surface # | 2 | 3 | 4 | 5 | 6 |
|---|---|---|---|---|---|
| k = | 4.22813E-01 | 1.43813E+01 | -1.00000E+00 | 2.00000E+00 | -1.00000E+00 |
| A4 = | -1.06874E-02 | -4.17983E-02 | 2.16515E-03 | 5.28395E-02 | -9.66883E-02 |
| A6 = | -1.94354E-03 | 2.02498E-02 | 2.48165E-01 | 2.28596E-01 | -1.25782E-01 |
| A8 = | -9.44645E-02 | 6.99112E-02 | -3.69944E-01 | -3.32975E-01 | -3.04443E-02 |
| A10 = | 2.13263E-01 | -1.91826E-01 | 2.42318E-01 | 3.18649E-01 | 2.44594E-01 |
| A12 = | -2.89909E-01 | | | | -2.89053E-01 |
| A14 = | | | | | 3.52257E-02 |
| A16 = | | | | | -2.40561E-02 |

| Surface # | 7 | 8 | 9 | 10 | 11 |
|---|---|---|---|---|---|
| k = | 2.00000E+00 | -1.76703E+00 | -6.92421E-01 | -2.63374E+00 | -2.85158E+00 |
| A4 = | 6.07023E-02 | 3.47821E-01 | 1.14929E-01 | -1.25990E-01 | -1.04890E-01 |
| A6 = | -1.95351E-01 | -2.61039E-01 | -2.22896E-02 | 4.08851E-02 | 3.56251E-02 |
| A8 = | 8.45993E-02 | 1.52898E-02 | 1.75318E-02 | -6.47938E-03 | -9.00231E-03 |
| A10 = | -6.83554E-04 | 8.60136E-02 | -1.96287E-03 | 3.21445E-04 | 1.49552E-03 |
| A12 = | | -3.13444E-02 | -1.37102E-03 | | -1.53033E-04 |
| A14 = | | | | | 5.81630E-06 |

FIG. 22

Table 15
(Eighth Preferred Embodiment)
f = 3.87 mm, Fno = 2.57, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.180 | | | | |
| 2 | Lens 1 | 1.458400 (ASP) | 0.494 | Glass | 1.567 | 42.8 | 2.41 |
| 3 | | -19.084000 (ASP) | 0.093 | | | | |
| 4 | Lens 2 | -13.793100 (ASP) | 0.220 | Plastic | 1.632 | 23.4 | -3.26 |
| 5 | | 2.439160 (ASP) | 0.346 | | | | |
| 6 | Lens 3 | 13.157900 (ASP) | 0.355 | Plastic | 1.632 | 23.4 | 12.60 |
| 7 | | -19.960100 (ASP) | 0.284 | | | | |
| 8 | Lens 4 | -1.184870 (ASP) | 0.520 | Plastic | 1.544 | 55.9 | 108.10 |
| 9 | | -1.341100 (ASP) | 0.096 | | | | |
| 10 | Lens 5 | 1.314930 (ASP) | 0.582 | Plastic | 1.530 | 55.8 | 29.00 |
| 11 | | 1.217490 (ASP) | 0.800 | | | | |
| 12 | IR-filter | Plano | 0.300 | Glass | 1.516 | 64.1 | - |
| 13 | | Plano | 0.744 | | | | |
| 14 | Image | Plano | - | | | | |

Note: Reference wavelength is equal to d-line 587.5nm, and ASP stands for aspherical surface

FIG. 23

Table 16
Aspheric Coefficients

| Surface # | 2 | 3 | 4 | 5 | 6 |
|---|---|---|---|---|---|
| k = | 5.42999E-01 | 1.43813E+01 | -1.00000E+00 | 1.73383E-01 | -1.00000E+00 |
| A4 = | -1.33476E-02 | 2.35064E-02 | 5.90660E-03 | -3.79487E-03 | -7.13863E-02 |
| A6 = | -4.23729E-03 | 5.08168E-03 | 2.21338E-01 | 2.48165E-01 | -1.61185E-01 |
| A8 = | -5.54029E-02 | -5.86939E-02 | -6.49602E-01 | -5.11520E-01 | -4.25029E-05 |
| A10 = | 1.84300E-01 | -2.07753E-01 | 3.45449E-01 | 3.71033E-01 | 2.88847E-01 |
| A12 = | -2.90404E-01 | | | | -3.09366E-01 |
| A14 = | | | | | 2.84966E-02 |
| A16 = | | | | | -3.15795E-02 |

| Surface # | 7 | 8 | 9 | 10 | 11 |
|---|---|---|---|---|---|
| k = | -1.00000E+00 | -3.44758E+00 | -8.09572E-01 | -3.49249E+00 | -3.64569E+00 |
| A4 = | 1.13098E-01 | 3.57714E-01 | 1.32062E-01 | -1.35106E-01 | -1.04677E-01 |
| A6 = | -2.40630E-01 | -2.69098E-01 | -2.37317E-02 | 4.17895E-02 | 3.37653E-02 |
| A8 = | 8.81019E-02 | 8.75147E-03 | 1.59227E-02 | -5.55200E-03 | -8.81879E-03 |
| A10 = | 1.24717E-02 | 8.82199E-02 | -2.67521E-03 | 3.06521E-04 | 1.52951E-03 |
| A12 = | | -3.10037E-02 | -9.14366E-04 | | -1.59092E-04 |
| A14 = | | | | | 8.82399E-06 |

FIG. 24

Table 17

| | First | Second | Third | Fourth | Fifth | Sixth | Seventh | Eighth |
|---|---|---|---|---|---|---|---|---|
| f | 3.82 | 3.96 | 4.38 | 4.63 | 4.12 | 3.87 | 3.98 | 3.87 |
| Fno | 2.60 | 2.60 | 2.40 | 2.80 | 2.52 | 2.55 | 2.55 | 2.57 |
| HFOV | 36.5 | 35.4 | 32.7 | 31.3 | 34.4 | 35.9 | 35.2 | 36.0 |
| V1−V2 | 32.1 | 34.5 | 32.5 | 32.1 | 32.1 | 32.5 | 19.4 | 19.4 |
| CT1/CT2 | 1.73 | 1.80 | 2.27 | 2.05 | 2.11 | 2.03 | 2.59 | 2.25 |
| (CT2+CT3)/f | 0.16 | 0.15 | 0.14 | 0.14 | 0.13 | 0.15 | 0.17 | 0.15 |
| R4/R3 | −0.17 | 0.16 | 0.36 | 0.55 | −0.35 | −0.23 | −0.31 | −0.18 |
| (R9−R10)/(R9+R10) | 0.054 | 0.050 | 0.017 | 0.038 | 0.023 | 0.034 | 0.037 | 0.038 |
| f/f1 | 1.31 | 1.09 | 1.49 | 1.40 | 1.34 | 1.37 | 1.60 | 1.61 |
| f/f3 | 0.06 | 0.06 | 0.04 | 0.08 | 0.09 | 0.31 | 0.17 | 0.31 |
| f5/f2 | −8.00 | −6.17 | −6.16 | −12.39 | −5.52 | −7.05 | −8.06 | −8.90 |
| \|f/f3\|+\|f/f4\|+\|f/f5\| | 0.52 | 0.63 | 0.26 | 0.20 | 0.32 | 0.48 | 0.38 | 0.48 |
| Td/f | 0.83 | 0.83 | 0.82 | 0.85 | 0.76 | 0.80 | 0.78 | 0.77 |

FIG. 25

IMAGE PICKUP OPTICAL LENS ASSEMBLY

BACKGROUND OF THE INVENTION

1. Field of the Invention

The present invention relates to an image pickup optical lens assembly, and more particularly to an optical lens assembly comprised of five lens elements that constitutes short total length and features good aberration correction that applies to electronic products for the capture of images.

2. Description of the Related Art

As science and technology advance, the development of optical systems used in digital cameras, lenses used in web cameras or mobile phone cameras tends to have a compact design and a low cost, while providing good aberration correction ability, high resolution, and high image quality.

In general, a conventional optical lens assembly of a mini electronic product comes with different designs, including the two-lens, three-lens, four-lens, and five-or-more lens designs. If the image quality is taken into consideration, the optical lens assemblies with the four-lens and five-lens designs have advantages on aberration correction and modulation transfer function (MTF), and the five-lens design having a higher resolution than the four-lens design is applicable for electronic products of high video quality or high pixel requirement.

In the products such as the mini digital cameras, web cameras, and mobile phone cameras, a compact optical lens assembly with a short focal length and a good aberration correction is required. In various five-lens designs, an image pickup optical lens assembly with a fixed focal length and different combinations of positive and negative refractive powers are adopted. As disclosed in Japanese Pat. Publication Nos. JP2006-293042 and JP2005-015521, U.S. Pat. No. 7,826,151, 2010/0254029 and 2010/0253829, a fifth lens element having an inflection point is adopted in the design for shortening the total length, and as disclosed in R.O.C. Taiwan Pat. No. I329755, 201038966, and M332199 and U.S. Pat. Nos. 7,710,665 and 7,502,181, a fourth-lens and a fifth-lens with different refractive powers are used. Although these designs can achieve a good aberration correction, yet it is difficult to improve the modulation transfer function (MTF) performance during the process of miniaturizing the optical lens assembly. In these prior arts, the fifth lens element having an inflection point is adopted to correct the aberration and distortion of images, but the lens elements with a negative refractive power (such as the second lens element and the fourth lens elements) may have insufficient width or depth of field in their allocating of the refractive power. Therefore, the present invention provides a practical and feasible design to shorten the optical lens assembly, while using the refractive power of the five lens elements and the combination of convex and concave surfaces to improve the image quality for the application on compact electronic devices, in addition to the effect of reducing the total length of the optical lens assembly.

SUMMARY OF THE INVENTION

Therefore, it is a primary objective of the present invention to provide an image pick-up optical lens assembly, sequentially arranged from an object side to an image side along an optical axis, comprising: a first lens element, a second lens element, a third lens element, a fourth lens element and a fifth lens element, wherein the first lens element with a positive refractive power has a convex object-side surface; the second lens element has a negative refractive power; the third lens element has a positive refractive power; the fourth lens element with a positive refractive power which is a meniscus lens having at least one of the object-side and image-side surfaces being aspheric; the fifth lens element with a positive refractive power has a convex object-side surface and a concave image-side surface, and at least one of the object-side and image-side surfaces is aspheric, and the image-side surface of the fifth lens element has at least one inflection point; and the image pick-up optical lens assembly satisfies the following relations:

$$0.7 < f/f_1 < 2.0 \quad (1)$$

$$0.8 < CT_1/CT_2 < 2.80 \quad (2)$$

Wherein, f is the focal length of the image pick-up optical lens assembly, $f_1$ is the focal length of the first lens element, $CT_1$ is the thickness of the first lens element on the optical axis, and $CT_2$ is the thickness of the second lens element on the optical axis.

The present invention further provides an image pick-up optical lens assembly as described above including: the first lens element, the second lens element, the third lens element, the fourth lens element and the fifth lens element, and satisfies not only the relations (1) and (2) but one of the following relations:

$$-0.5 < R_4/R_3 < 0.5 \quad (4)$$

$$0.07 < (CT_2 + CT_3)/f < 0.18 \quad (5)$$

$$|f/f_3| + |f/f_4| + |f/f_5| < 0.65 \quad (6)$$

Wherein, $R_3$ is the radius of curvature of the object-side surface of the second lens element, $R_4$ is the radius of curvature of the image-side surface of the second lens element, $CT_2$ is the thickness of the second lens element on the optical axis, $CT_3$ is the thickness of the third lens element on the optical axis, f is the focal length of the image pick-up optical lens assembly, $f_3$ is the focal length of the third lens element, $f_4$ is the focal length of the fourth lens element, and $f_5$ is the focal length of the fifth lens element.

The present invention further provides an image pick-up optical lens assembly, sequentially arranged from an object side to an image side along an optical axis, comprising: a first lens element, a second lens element, a third lens element, a fourth lens element and a fifth lens element, wherein the first lens element with a positive refractive power has a convex object-side surface, and the first lens element is made of a glass material; the second lens element with a negative refractive power has a concave object-side surface and a concave image-side surface; the third lens element has a positive refractive power; the fourth lens element is a meniscus lens element with a positive refractive power and having a concave object-side surface and a convex object-side surface, and at least one of the object-side and image-side surfaces is aspheric; the fifth lens element with a positive refractive power is made of a plastic material, and has a convex object-side surface and a concave image-side surface, and at least one of the object-side and image-side surfaces is aspheric, and the image-side surface of the fifth lens element has at least one inflection point. The first lens element, second lens element, third lens element, fourth lens element and fifth lens element on the optical axis are arranged with a specific air gap apart from each other for imaging an object to be photographed at an image side. For various purposes of applications, the image pickup optical lens assembly satisfies one or more combinations of the following relations, in addition to Relations (1), (10) and (3):

$$|f/f_3| + |f/f_4| + |f/f_5| < 0.90 \quad (3)$$

$$0.65 < T_d/f < 0.95 \quad (7)$$

$$-13.5 < f_5/f_2 < -4.0 \quad (8)$$

$$0.01 < (R_9 - R_{10})/(R_9 + R_{10}) < 0.07 \quad (9)$$

$$28 < v_1 - v_2 < 40 \quad (10)$$

$$0 < f/f_3 < 0.24 \quad (11)$$

Wherein, f is the focal length of the image pick-up optical lens assembly, $f_2$ is the focal length of the second lens element, $f_3$ is the focal length of the third lens element, $f_4$ is the focal length of the fourth lens element, $f_5$ is the focal length of the fifth lens element, $T_d$ is the distance from the object-side surface of the first lens element to the image-side surface of the fifth lens element on the optical axis, $R_9$ is the radius of curvature of the object-side surface of the fifth lens element, $R_{10}$ is the radius of curvature of the image-side surface of the fifth lens element, $v_1$ is the Abbe number (or Abbe number) of the first lens element, and $v_2$ is the Abbe number of the second lens element.

Another objective of the present invention is to provide an image pick-up optical lens assembly, sequentially arranged from an object side to an image side along an optical axis, comprising: a first lens element, a second lens element, a third lens element, a fourth lens element and a fifth lens element, wherein the first lens element with a positive refractive power has a convex object-side surface; the second lens element has a negative refractive power; the third lens element has a positive refractive power; the fourth lens element with a positive refractive power, which is a meniscus lens element, and had at least one of the object-side and image-side surfaces being aspheric; and the fifth lens element with a positive refractive power has a convex object-side surface and a concave image-side surface, and at least one of the object-side and image-side surfaces is aspheric, and the image-side surface of the fifth lens element has at least one inflection point. The image pick-up optical lens assembly satisfies the following relations:

$$|f/f_3| + |f/f_4| + |f/f_5| < 0.90 \quad (3)$$

$$-0.9 < R_4/R_3 < 0.9 \quad (12)$$

Wherein, f is the focal length of the image pick-up optical lens assembly, $f_3$ is the focal length of the third lens element, $f_4$ is the focal length of the fourth lens element, $f_5$ is the focal length of the fifth lens element, $R_3$ is the radius of curvature of the object-side surface of the second lens element, and $R_4$ is the radius of curvature of the image-side surface of the second lens element.

The present invention further provides an image pick-up optical lens assembly, wherein the first lens element with a positive refractive power has a convex object-side surface; the second lens element with a negative refractive power has a concave image-side surface; the third lens element has a positive refractive power; the fourth lens element with a positive refractive power is a meniscus lens element, where its object-side surface is concave and image-side surface is convex, and at least one of the object-side surface and image-side surface is aspheric; the fifth lens element with a positive refractive power is made of a plastic material and has a convex object-side surface and a concave image-side surface, and at least one of the object-side and image-side surfaces is aspheric, where the image-side surface of the fifth lens element has at least one inflection point. The image pick-up optical lens assembly satisfies one or more combinations of the following relations, in addition to Relations (3) and (12):

$$28 < v_1 - v_2 < 40 \quad (10)$$

Preferably, $|f/f_3| + |f/f_4| + |f/f_5| < 0.65 \quad (6)$

Preferably, $-0.5 < R_4/R_3 < 0.5 \quad (4)$ $$-13.5 < f_5/f_2 < -4.0 \quad (8)$$

$$0.01 < (R_9 - R_{10})/(R_9 + R_{10}) < 0.07 \quad (9)$$

$$0.07 < (CT_2 + CT_3)/f < 0.18 \quad (5)$$

Wherein, $v_1$ is the Abbe number of the first lens element, $v_2$ is the Abbe number of the second lens element, f is the focal length of the image pick-up optical lens assembly, $f_2$ is the focal length of the second lens element, $f_3$ is the focal length of the third lens element, $f_4$ is the focal length of the fourth lens element, $f_5$ is the focal length of the fifth lens element, $R_9$ is the radius of curvature of the object-side surface of the fifth lens element, $R_{10}$ is the radius of curvature of the image-side surface of the fifth lens element, $CT_2$ is the thickness of the second lens element along the optical axis, and $CT_3$ is the thickness of the third lens element along the optical axis.

The present invention further provides an image pick-up optical lens assembly, sequentially arranged from an object side to an image side along an optical axis, comprising: a first lens element, a second lens element, a third lens element, a fourth lens element and a fifth lens element, wherein the first lens element with a positive refractive power is made of a glass material and has a convex object-side surface; the second lens element with a negative refractive power has a concave image-side surface; the third lens element has a positive refractive power; the fourth lens element with a positive refractive power is a meniscus lens having a concave object-side surface and a convex image-side surface, and at least one of the object-side and image-side surfaces is aspheric; and the fifth lens element with a positive refractive power is made of a plastic material and has a convex object-side surface and a concave image-side surface, and at least one of the object-side and image-side surfaces is aspheric, and the image-side surface of the fifth lens element has at least one inflection point. The image pick-up optical lens assembly satisfies one or a combination of the following relations, in addition to Relations (3) and (12):

$$0 < f/f_3 < 0.24 \quad (11)$$

Wherein, f is the focal length of the image pick-up optical lens assembly, and $f_3$ is the focal length of the third lens element.

With appropriate gaps formed among the first lens element, second lens element, third lens element, fourth lens element and fifth lens element along the optical axis of the present invention, the total length of the optical lens assembly can be shortened and good aberration correction and modulation transfer function (MTF) can be achieved effectively to its application as an image pick-up optical lens assembly for small electronic products.

In the image pick-up optical lens assembly of the present invention, the combination of the first lens element with a positive refractive power and the second lens element with a negative refractive power provides the required refractive power and corrects the aberration. Furthermore, the positive refractive power of the third and fourth lens elements provides greater refractive power, decreases the focal length, and adopts the modulation transfer function (MTF). Hence, the fifth lens element and the fourth lens element have a shorter gap in between to correct the aberrations, including chromatic aberrations, of the fourth lens element, so as to improve the overall resolution, to meet the high resolution requirement.

In the image pick-up optical lens assembly of the present invention, the combination of the first lens element with a positive refractive power, the second lens element with a negative refractive power, the third lens element with a positive refractive power and the combination of the fourth and fifth lens elements can shorten the total length of the image pick-up optical lens assembly.

In the image pick-up optical lens assembly of the present invention, the first lens element can be made of a glass material in order to shorten the focal length of the first lens element, and to increase the refractive power of the first lens element that facilitates its imaging and reduces its aberration.

In the image pick-up optical lens assembly of the present invention, the fifth lens element can be made of a plastic material to favor the manufacturing and the cost of the lens production.

BRIEF DESCRIPTION OF THE DRAWINGS

FIG. 9 shows Table 1 that lists optical data of the first preferred embodiment of the present invention;

FIG. 10 shows Table 2 that lists aspherical surface data of the first preferred embodiment of the present invention;

FIG. 11 shows Table 3 that lists optical data of the second preferred embodiment of the present invention;

FIG. 12 shows Table 4 that lists aspherical surface data of the second preferred embodiment of the present invention;

FIG. 13 shows Table 5 that lists optical data of the third preferred embodiment of the present invention;

FIG. 14 shows Table 6 that lists aspherical surface data of the third preferred embodiment of the present invention;

FIG. 15 shows Table 7 that lists optical data of the fourth preferred embodiment of the present invention;

FIG. 16 shows Table 8 that lists aspherical surface data of the fourth preferred embodiment of the present invention;

FIG. 17 shows Table 9 that lists optical data of the fifth preferred embodiment of the present invention;

FIG. 18 shows Table 10 that lists aspherical surface data of the fifth preferred embodiment of the present invention;

FIG. 19 shows Table 11 that lists optical data of the sixth preferred embodiment of the present invention;

FIG. 20 shows Table 12 that lists aspherical surface data of the sixth preferred embodiment of the present invention;

FIG. 21 shows Table 13 that lists optical data of the seventh preferred embodiment of the present invention;

FIG. 22 shows Table 14 that lists aspherical surface data of the seventh preferred embodiment of the present invention;

FIG. 23 shows Table 15 that lists optical data of the eighth preferred embodiment of the present invention;

FIG. 24 shows Table 16 that lists aspherical surface data of the eighth preferred embodiment of the present invention; and FIG. 25 shows Table 17 that lists data of related relation in the first to the eighth preferred embodiments of the present invention.

DETAILED DESCRIPTION OF THE PREFERRED EMBODIMENTS

Figure 1A:
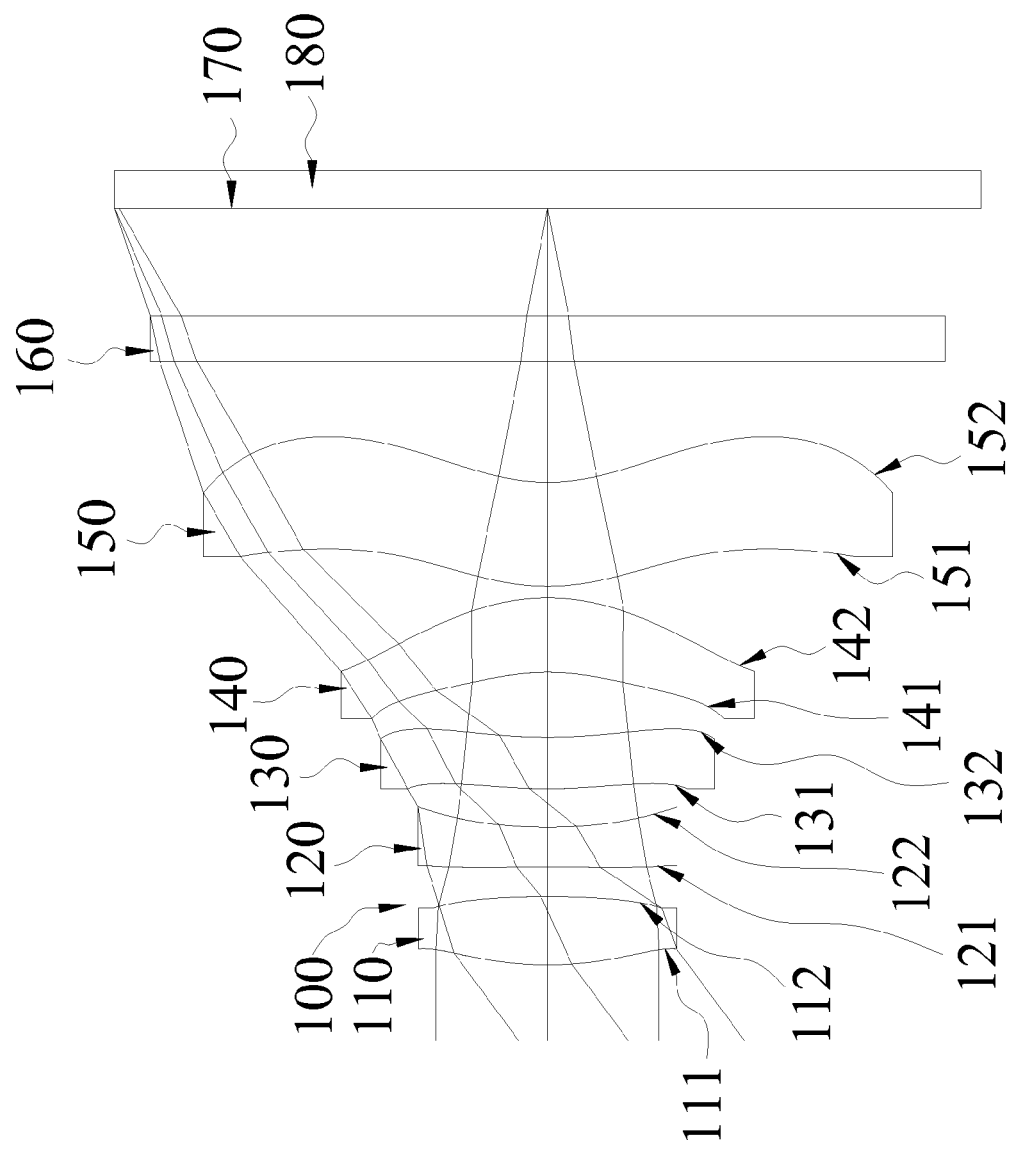
FIG. 1A is a schematic view of an optical lens assembly in accordance with a first preferred embodiment of the present invention.

With reference to FIG. 1A for an image pick-up optical lens assembly of the present invention, the image pick-up optical lens assembly, sequentially arranged from an object side to an image side along an optical axis, comprises: a first lens element (110), a second lens element (120), a third lens element (130), a fourth lens element (140) and a fifth lens element (150), wherein the first lens element (110) with a positive refractive power has a convex object-side surface (111) and a convex or concave image-side surface near the optical axis, and the object-side surface (111) and the image-side surface (112) can be aspheric or spheric; the second lens element (120) with a negative refractive power has a convex or concave object-side surface and a concave image-side surface (122) near the optical axis, and the object-side surface (121) and the image-side surface (122) can be aspheric or spheric; the third lens element (130) with a positive refractive power is a meniscus or bi-convex lens near the optical axis and has an object-side surface (131) and an image-side surface (132) which can be aspheric or spheric; the fourth lens element (140) with a positive refractive power is a meniscus lens near the optical axis and has a concave or convex object-side surface, and the object-side surface (141) and image-side surface (142) can be aspheric or spheric; the fifth lens element (150) with a positive refractive power has a convex object-side surface (151) and a concave image-side surface (152) near the optical axis, and the object-side surface (151) and image-side surface (152) can be aspheric or spheric, and the image-side surface (152) has at least one inflection point. The image pick-up optical lens assembly further comprises an aperture (100) and an infrared filter (160), wherein the aperture (100) is installed between the first lens element (110) and the second lens element (120), or between the first lens element (110) and an object to be photographed, and the infrared filter (160) is installed between the fifth lens element (150)

and an image plane (170), and is generally made of a plate optical material without affecting the overall focal length of the image pickup optical lens assembly of present invention. The image pick-up optical lens assembly further comprises an image sensor (180) installed at the image plane (170) for imaging the object to be photographed. The first lens element (110), second lens element (120), third lens element (130), fourth lens element (140) and fifth lens element (150) come with aspherical optical surfaces in compliance with the aspherical surface formula as given in Equation (13):

$$X(Y) = \frac{(Y^2/R)}{1+\sqrt{(1-(1+K)(Y/R)^2)}} + \sum_i (A_i) \cdot (Y^i) \quad (13)$$

Wherein, X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

With the installation of the aforementioned first lens element (110), second lens element (120), third lens element (130), fourth lens element (140), fifth lens element (150), aperture (100) and image sensor (180), the image pick-up optical lens assembly satisfies the relations (1) and (2).

If the ratio of the focal length $f_1$ of the first lens element (110) to the overall focal length f is limited to the condition as shown in Relation (1), the first lens element (110) will have a shorter focal length capable of adjusting the refractive power of the first lens element (110) appropriately. If the focal length $f_1$ of the first lens element (110) is too small, then the total length of the image pick-up optical lens assembly will be too long, and the angle for entering the light into the image sensor of the image pick-up optical lens assembly will be greater. If the focal length $f_1$ of the first lens element (110) is too large, then the field angle of the image pick-up optical lens assembly will be too small. If the ratio of the thickness $CT_1$ of the first lens element (110) to the thickness $CT_2$ of the second lens element (120) on the optical axis is limited to the Relation (2), the difference of the thickness $CT_1$ of the first lens element (110) from the thickness of the second lens element (120) will not be too large, such that the level of the positive refractive power of the first lens element (110) can be reduced, in addition to the effect of shortening the total length.

If the Relations (3), (6), (8) or (11) is satisfied, the overall focal length f, the focal length $f_1$ of the first lens element (110), the focal length $f_2$ of the second lens element (120), the focal length $f_3$ of the third lens element (130), the focal length $f_4$ of the fourth lens element (140) and the focal length $f_5$ of the fifth lens element (150) can be maintained appropriately to allocate the refractive power required by the first lens element (110), third lens element (130), fourth lens element (140) and fifth lens element (150) of the image pick-up optical lens assembly and improve the sensitivity of the image pick-up optical lens assembly effectively.

If the difference between the Abbe number $v_1$ of the first lens element (110) and the Abbe number $v_2$ of the second lens element (120) is limited to the Relation (10), then the chromatic aberration between the first lens element (110) and the second lens element (120) can be reduced, and the chromatic aberration compensation of the second lens element (120) can be improved to correct the chromatic aberration produced by the first lens element (110) and the second lens element (120) effectively.

If the ratio of the sum of the thickness $CT_2$ of the second lens element (120) and the thickness $CT_3$ of the third lens element (130) on the optical axis to the overall focal length f is limited to the condition as shown in Relation (5), or the distance $T_d$ from the object-side surface (111) of the first lens element (110) to the image-side surface (152) of the fifth lens element (150) on the optical axis is limited to Relation (7), the total length of the optical lens assembly can be restricted.

If the ratio of the radius of curvature $R_3$ of the object-side surface (121) of the second lens element (120) to the radius of curvature $R_4$ of the image-side surface (122) of the second lens element (120) is limited to Relation (4) or (12), the aberration correction capability of the second lens element (120) with a negative refractive power can be improved. If the radius of curvature $R_9$ of the object-side surface (151) of the fifth lens element (150) and the radius of curvature $R_{10}$ of the image-side surface (152) of the fifth lens element (150) are limited to Relation (9), the curvature of the optical surfaces on both sides of the fifth lens element (150) can be adjusted to shorten the total length of the optical lens assembly, in addition to the improvement of the aberration correction capability.

The image pick-up optical lens assembly of the present invention is described by preferred embodiments and related drawings in details as follows.

First Preferred Embodiment

Figure 1B:
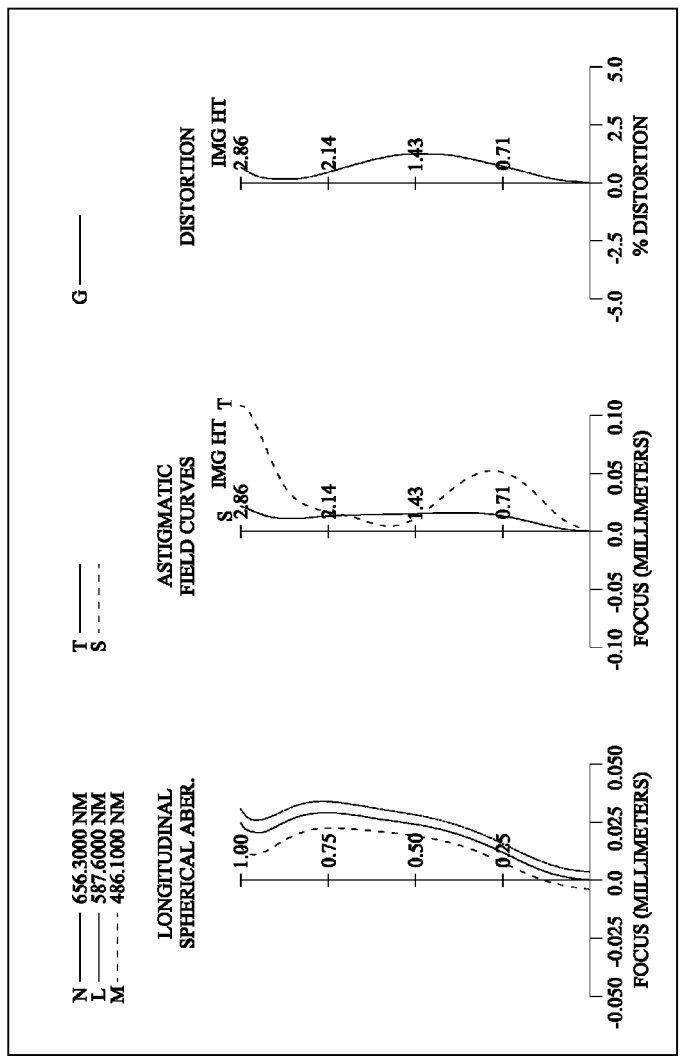
FIG. 1B is a series of aberration curves of the first preferred embodiment of the present invention.

With reference to FIGS. 1A and 1B for a schematic view and an aberration curve of an image pick-up optical lens assembly in accordance with the first preferred embodiment of the present invention respectively, the image pick-up optical lens assembly comprises five lens elements, and the five lens elements, sequentially arranged from an object side to an image side along an optical axis, include: a first lens element (110) with a positive refractive power, which is a bi-convex lens element made of a plastic material and having an aspheric object-side surface (111) and an aspheric image-side surface (112) in this embodiment; a second lens element (120) with a negative refractive power, which is a plastic lens element having a concave object-side surface (121) and a concave image-side surface (122) near the optical axis, and both its object-side surface (121) and image-side surface (122) are aspheric; a third lens element (130) with a positive refractive power, which is a plastic lens element having a convex object-side surface (131) and a concave image-side surface (132), and both object-side surface (131) and image-side surface (132) near the optical axis are aspheric; a fourth lens element (140) with a positive refractive power, which is a plastic lens element having a concave object-side surface (141) and a convex image-side surface (142), and both object-side surface (141) and image-side surface (142) are aspheric; and a fifth lens element (150) with a positive refractive power, which is a plastic lens element having a convex object-side surface (151) and a concave image-side surface (152), and both object-side surface (151) and image-side surface (152) are aspheric, and the image-side surface (152) of the fifth lens element (150) has at least one inflection point. In this preferred embodiment, the image pick-up optical lens assembly further comprises an aperture (100) installed between the first lens element (110) and the second lens element (120). With the aperture (100) and the first lens element (110), second lens element (120), third lens element (130), fourth lens element (140) and fifth lens element (150) arranged on the optical axis, the object to be photographed can be imaged on the image plane (170).

The image pick-up optical lens assembly of this preferred embodiment can be installed in an optical system, and the optical system further comprises an infrared filter (IR-filter) (160) and an image sensor (180), wherein the infrared filter (160) is generally made of a plate glass material without affecting the focal length of the image pick-up optical lens assembly of the present invention, and the image sensor (180) which can be an electronic photosensor installed on an image plane (170) for converting the light of an image electronically.

With reference to FIG. 9 (which shows Table 1) for optical data of this preferred embodiment, the object-side surface (111) and image-side surface (112) of the first lens element (110), the object-side surface (121) and image-side surface (122) of the second lens element (120), the object-side surface (131) and image-side surface (132) of the third lens element (130), the object-side surface (141) and image-side surface (142) of the fourth lens element (140), and the object-side surface (151) and image-side surface (152) of the fifth lens element (150) satisfy the aspherical surface formula as given in Equation (13), and FIG. 10 (which shows Table 2) lists the aspherical surface coefficients.

In the image pickup optical lens assembly of this preferred embodiment, the focal length of the whole image pickup optical system is f=3.82 (mm), the aperture value (f-number) of the whole image pickup optical system is Fno=2.60, and half of the maximum view angle is HFOV=36.5 (degrees).

With reference to Table 1 for this preferred embodiment, f is the focal length of the image pick-up optical lens assembly, $f_1$ is the focal length of the first lens element (110) on the optical axis, $CT_1$ is the thickness of the first lens element (110) on the optical axis, $CT_2$ is the thickness of the second lens element (120) on the optical axis, and they satisfy the Relations (1) and (2) as follows: $f/f_1=1.31$ and $CT_1/CT_2=1.73$.

In this preferred embodiment, $v_1$ is the Abbe number of the first lens element (110) and $v_2$ is the Abbe number of the second lens element (120) of the image pick-up optical lens assembly, and they satisfy Equation (10): $v_1-v_2=32.1$; $T_d$ is the distance from the object-side surface (111) of the first lens element (110) to the image-side surface (152) of the fifth lens element (150) on the optical axis, f is the focal length of the image pick-up optical lens assembly, and they satisfy Equation (7): $T_d/f=0.83$; $CT_2$ is the thickness of the second lens element (120) on the optical axis, $CT_3$ is the thickness of the third lens element (130) on the optical axis, and they satisfy Equation (5): $(CT_2+CT_3)/f=0.16$; $R_3$ is the radius of curvature of the object-side surface (121) of the second lens element (120), $R_4$ is the radius of curvature of the image-side surface (122) of the second lens element (120), $R_9$ is the radius of curvature of the object-side surface (151) of the fifth lens element (150), $R_{10}$ is the radius of curvature of the image-side surface (152) of the fifth lens element (150), and they satisfy Equation (4) or Equation (12) and Equation (9): $R_4/R_3=-0.17$ and $(R_9-R_{10})/(R_9+R_{10})=0.054$.

The image pick-up optical lens assembly satisfies the following relation (3) or (6), or (8) or (11): $|f/f_3|+|f/f_4|+|f/f_5|=0.52$, $f_5/f_2=-8.0$ and $f/f_3=0.06$, wherein f is the overall focal length of the image pick-up optical lens assembly, $f_1$ is the focal length of the first lens element (110), $f_2$ is the focal length of the second lens element (120), $f_3$ is the focal length of the third lens element (130), $f_4$ is the focal length of the fourth lens element (140), $f_5$ is the focal length of the fifth lens element (150), and data of the foregoing relations are listed in FIG. 25 (which shows Table 17).

From the optical data listed in FIG. 9 (which is Table 1) and the aberration curve as shown in FIG. 1B, good compensation effects of the longitudinal spherical aberration, astigmatic field curving and distortion can be achieved by the image pickup optical lens assembly in accordance with this preferred embodiment of the present invention.

Second Preferred Embodiment

Figure 2A:
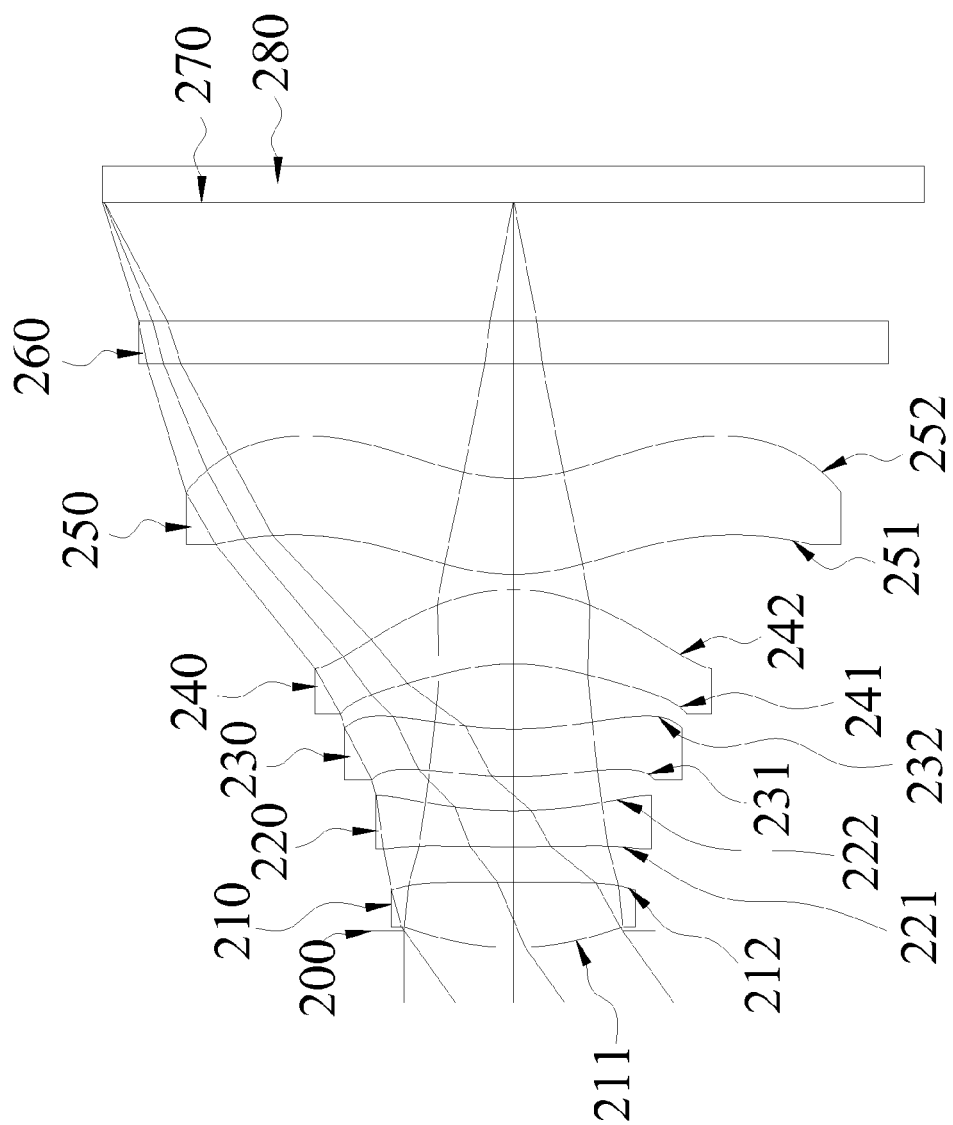
FIG. 2A is a schematic view of an optical lens assembly in accordance with a second preferred embodiment of the present invention.
Figure 2B:
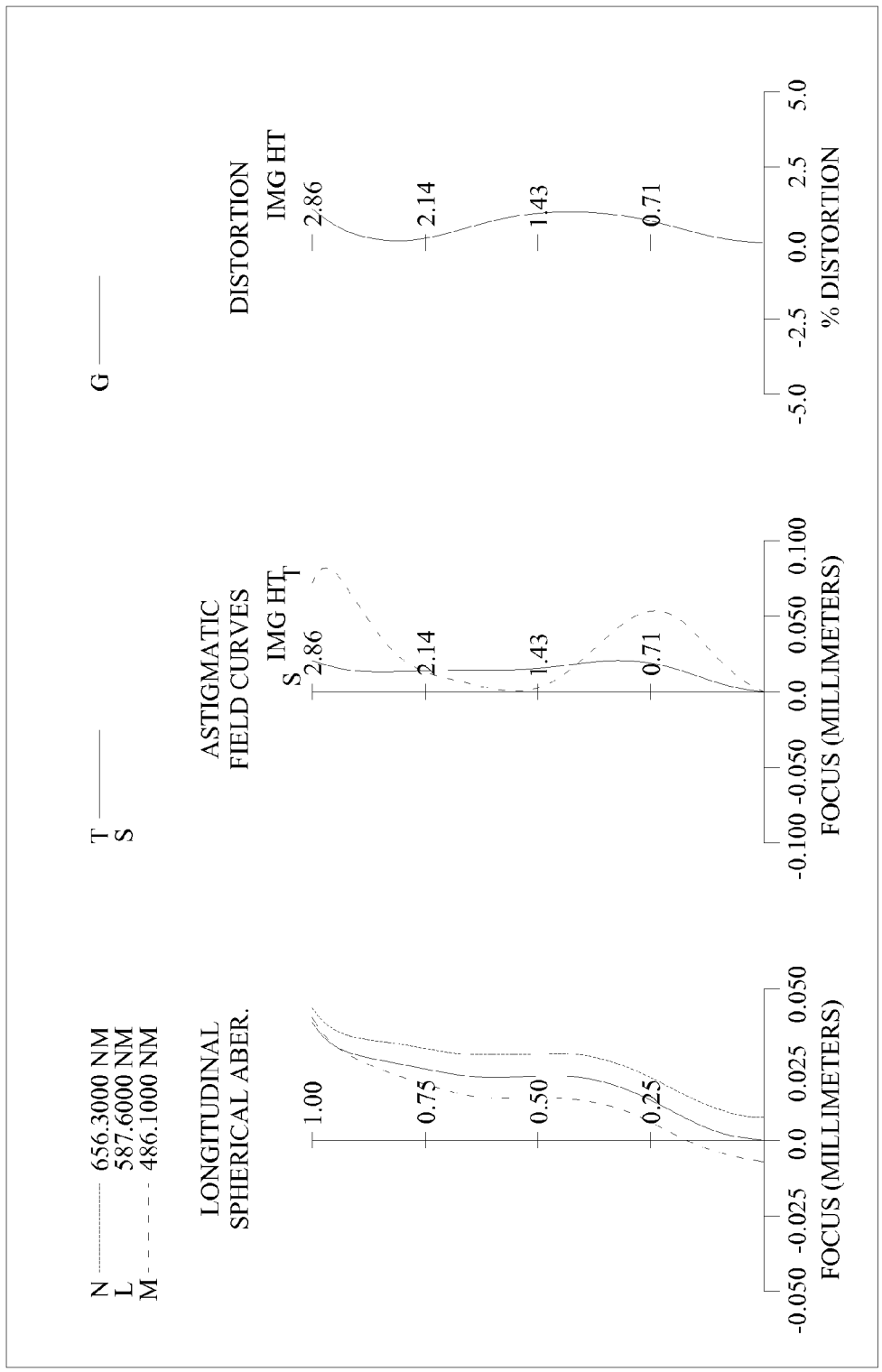
FIG. 2B is a series of aberration curves of the second preferred embodiment of the present invention.

With reference to FIGS. 2A and 2B for a schematic view and an aberration curve of an image pick-up optical lens assembly in accordance with the second preferred embodiment of the present invention respectively, the image pick-up optical lens assembly comprises five lens elements, and the five lens elements sequentially arranged from an object side to an image side along an optical axis, include: a first lens element (210) with a positive refractive power, which is a lens element made of a plastic material and has a convex object-side surface (211) and a concave image-side surface (212) near the optical axis, and both object-side surface (211) and image-side surface (212) are aspheric; a second lens element (220) with a negative refractive power, which is a plastic lens element having a convex object-side surface (221) and a concave image-side surface (222) near the optical axis, and both its object-side surface (221) and image-side surface (222) are aspheric; a third lens element (230) with a positive refractive power, which is a plastic lens element having a convex object-side surface (231) and a concave image-side surface (232), and both object-side surface (231) and image-side surface (232) near the optical axis are aspheric; a fourth lens element (240) with a positive refractive power, which is a plastic lens element having a concave object-side surface (241) and a convex image-side surface (242), and both object-side surface (241) and image-side surface (242) are aspheric; a fifth lens element (250) with a positive refractive power, which is a plastic lens element having a convex object-side surface (251) and a concave image-side surface (252), and both object-side surface (251) and image-side surface (252) are aspheric, and the image-side surface (252) of the fifth lens element (250) has at least one inflection point. In this preferred embodiment, the image pick-up optical lens assembly further comprises an aperture (200) installed between the first lens element (210) and the object to be photographed. With the aperture (200) and the first lens element (210), second lens element (220), third lens element (230), fourth lens element (140) and fifth lens element (250) arranged on the optical axis, the object to be photographed can be imaged on the image plane (270).

The image pick-up optical lens assembly of this preferred embodiment can be installed in an optical system, and the optical system further comprises an infrared filter (IR-filter) (260) and an image sensor (280), wherein the infrared filter (260) is generally made of a plate glass material without affecting the focal length of the image pick-up optical lens assembly of the present invention, and the image sensor (280) which can be an electronic photosensor installed on an image plane (270) for converting the light of an image electronically.

With reference to FIG. 11 (which shows Table 3) for optical data of this preferred embodiment, the object-side surface (211) and image-side surface (212) of the first lens element (210), the object-side surface (221) and image-side surface (222) of the second lens element (220), the object-side surface (231) and image-side surface (232) of the third lens element (230), the object-side surface (241) and image-side surface (242) of the fourth lens element (240), and the object-side surface (251) and image-side surface (252) of the fifth lens element (250) satisfy the aspherical surface formula as given in Equation (13), and FIG. 11 (which shows Table 3) lists the aspherical surface coefficients.

In the image pickup optical lens assembly of this preferred embodiment, the focal length of the whole image pickup optical system is f=3.96 (mm), the aperture value of the whole image pickup optical system is Fno=2.60, and half of the maximum view angle is HFOV=35.4 (degrees).

With reference to Table 3 for this preferred embodiment, f is the focal length of the image pick-up optical lens assembly, $f_1$ is the focal length of the first lens element (210) on the optical axis, $CT_1$ is the thickness of the first lens element (210) on the optical axis, $CT_2$ is the thickness of the second lens element (220) on the optical axis, and they satisfy the Relations (1) and (2) as follows: $f/f_1=1.09$ and $CT_1/CT_2=1.80$.

In this preferred embodiment, $v_1$ is the Abbe number of the first lens element (210) and $v_2$ is the Abbe number of the second lens element (220) of the image pick-up optical lens assembly, and they satisfy Equation (10): $v_1-v_2=34.5$; $T_d$ is the distance from the object-side surface (211) of the first lens element (210) to the image-side surface (252) of the fifth lens element (250) on the optical axis, f is the focal length of the image pick-up optical lens assembly, and they satisfy Equation (7): $T_d/f=0.83$; $CT_2$ is the thickness of the second lens element (220) on the optical axis, $CT_3$ is the thickness of the third lens element (230) on the optical axis, and they satisfy Equation (5): $(CT_2+CT_3)/f=0.15$; $R_3$ is the radius of curvature of the object-side surface (221) of the second lens element (220), $R_4$ is the radius of curvature of the image-side surface (222) of the second lens element (220), $R_9$ is the radius of curvature of the object-side surface (251) of the fifth lens element (250), $R_{10}$ is the radius of curvature of the image-side surface (252) of the fifth lens element (250), and they satisfy Equation (4) or Equation (12) and Equation (9): $R_4/R_3=-0.16$ and $(R_9-R_{10})/(R_9+R_{10})=0.05$.

The image pick-up optical lens assembly satisfies the following relation (3) or (6), or (8) or (11): $|f/f_3|+|f/f_4|+|f/f_5|=0.63$, $f_5/f_2=-6.17$ and $f/f_3=0.06$, wherein f is the overall focal length of the image pick-up optical lens assembly, $f_1$ is the focal length of the first lens element (210), $f_2$ is the focal length of the second lens element (220), $f_3$ is the focal length of the third lens element (230), $f_4$ is the focal length of the fourth lens element (240), $f_5$ is the focal length of the fifth lens element (250), and data of the foregoing relations are listed in FIG. 25 (which shows Table 17).

From the optical data listed in FIG. 11 (which is Table 3) and the aberration curve as shown in FIG. 2B, good compensation effects of the longitudinal spherical aberration, astigmatic field curving and distortion can be achieved by the image pickup optical lens assembly in accordance with this preferred embodiment of the present invention.

Third Preferred Embodiment

Figure 3A:
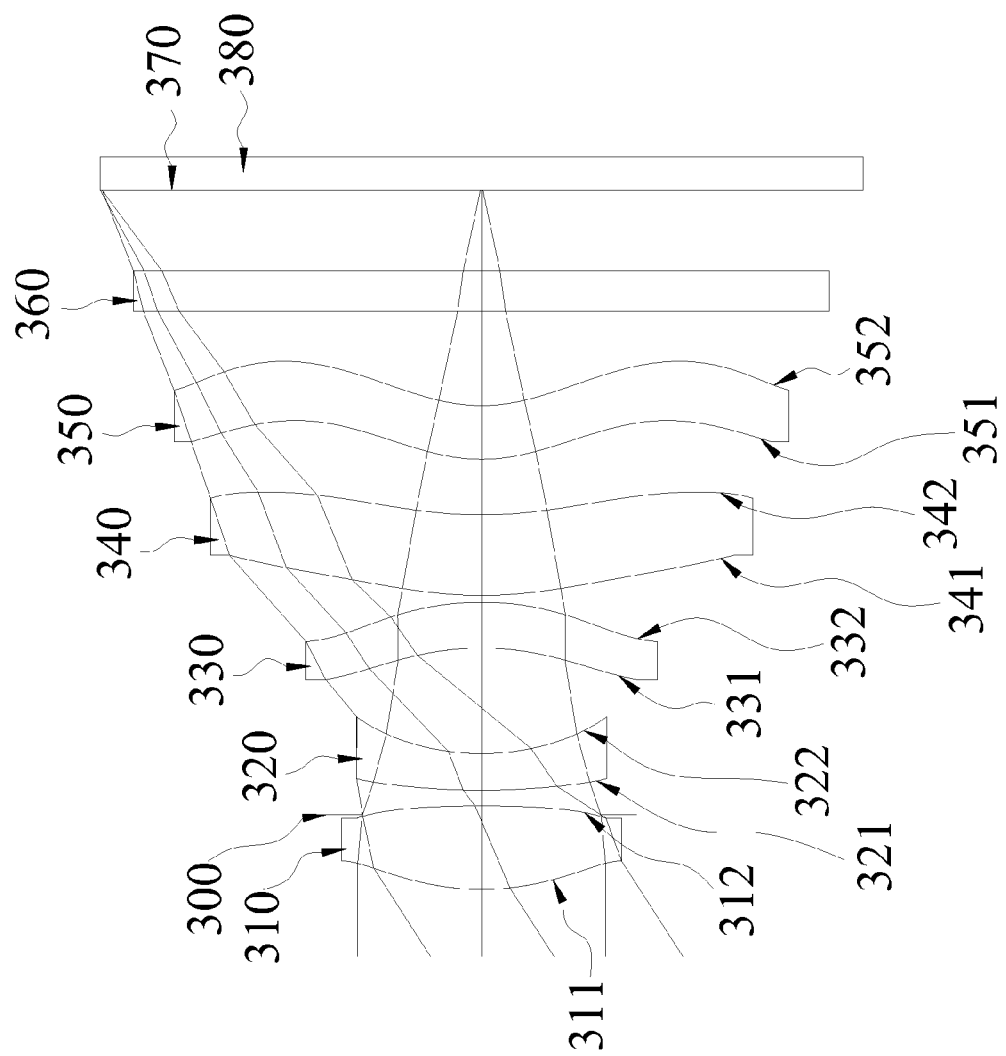
FIG. 3A is a schematic view of an optical lens assembly in accordance with a third preferred embodiment of the present invention.
Figure 3B:
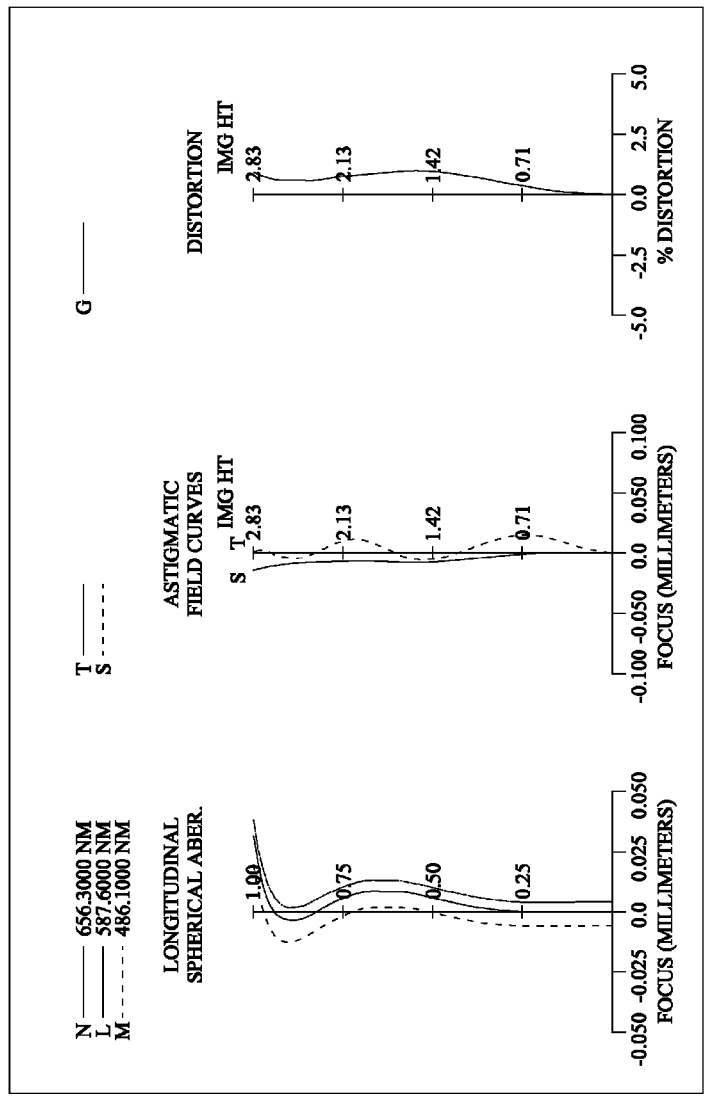
FIG. 3B is a series of aberration curves of the third preferred embodiment of the present invention.

With reference to FIGS. 3A and 3B for a schematic view and an aberration curve of an image pick-up optical lens assembly in accordance with the third preferred embodiment of the present invention respectively, the image pick-up optical lens assembly comprises five lens elements, and the five lens elements sequentially arranged from an object side to an image side along an optical axis, include: a first lens element (310) with a positive refractive power, which is a bi-convex lens element made of a plastic material and has an aspheric object-side surface (311) and an aspheric image-side surface (312); a second lens element (320) with a negative refractive power, which is a plastic lens element having a convex object-side surface (321) and a concave image-side surface (322), and both its object-side surface (321) and image-side surface (322) are aspheric near the optical axis; a third lens element (330) with a positive refractive power, which is a plastic lens element having a concave object-side surface (331) and a convex image-side surface (332), and both object-side surface (331) and image-side surface (332) are aspheric near the optical axis; a fourth lens element (340) with a positive refractive power which is a plastic lens element having a convex object-side surface (341) and a concave image-side surface (342), and both object-side surface (341) and image-side surface (342) are aspheric near the optical axis; a fifth lens element (350) with a positive refractive power, which is a plastic lens element having a convex object-side surface (351) and a concave image-side surface (352), and both object-side surface (351) and image-side surface (352) are aspheric near the optical axis, and the image-side surface (352) of the fifth lens element (350) has at least one inflection point. In this preferred embodiment, the image pick-up optical lens assembly further comprises an aperture (300) installed between the first lens element (310) and the second lens element (320). With the aperture (300) and the first lens element (310), second lens element (320), third lens element (330), fourth lens element (340) and fifth lens element (350) arranged on the optical axis, the object to be photographed can be imaged on the image plane (370).

The image pickup optical lens assembly of this preferred embodiment can be installed in an optical system, and the optical system further comprises an infrared filter (IR-filter) (360) and an image sensor (380), wherein the infrared filter (360) is generally made of a plate glass material without affecting the focal length of the image pick-up optical lens assembly of the present invention, and the image sensor (380) which can be an electronic photosensor installed on an image plane (370) for converting the light of an image electronically.

With reference to FIG. 13 (which shows Table 5) for optical data of this preferred embodiment, the object-side surface (311) and image-side surface (312) of the first lens element (310), the object-side surface (321) and image-side surface (322) of the second lens element (320), the object-side surface (331) and image-side surface (332) of the third lens element (330), the object-side surface (341) and image-side surface (342) of the fourth lens element (340), and the object-side surface (351) and image-side surface (352) of the fifth lens element (350) satisfy the aspherical surface formula as given in Equation (13), and FIG. 14 (which shows Table 4) lists the aspherical surface coefficients.

In the image pickup optical lens assembly of this preferred embodiment, the focal length of the whole image pickup optical system is f=4.38 (mm), the aperture value of the whole image pickup optical system is Fno=2.40, and half of the maximum view angle is HFOV=32.7 (degrees).

With reference to Table 5 for this preferred embodiment, f is the focal length of the image pick-up optical lens assembly, $f_1$ is the focal length of the first lens element (310) on the optical axis, $CT_1$ is the thickness of the first lens element (310) on the optical axis, $CT_2$ is the thickness of the second lens element (320) on the optical axis, and they satisfy the Relations (1) and (2) as follows: $f/f_1=1.49$ and $CT_1/CT_2=2.27$.

In this preferred embodiment, $v_1$ is the Abbe number of the first lens element (310) and $v_2$ is the Abbe number of the second lens element (320) of the image pick-up optical lens assembly, and they satisfy Equation (10): $v_1-v_2=32.5$; $T_d$ is the distance from the object-side surface (311) of the first lens element (310) to the image-side surface (352) of the fifth lens element (350) on the optical axis, f is the focal length of the image pick-up optical lens assembly, and they satisfy Equation (7): $T_d/f=0.82$; $CT_2$ is the thickness of the second lens element (320) on the optical axis, $CT_3$ is the thickness of the third lens element (330) on the optical axis, and they satisfy Equation (5): $(CT_2+CT_3)/f=0.14$; $R_3$ is the radius of curvature of the object-side surface (321) of the second lens element (320), $R_4$ is the radius of curvature of the image-side surface (322) of the second lens element (320), $R_9$ is the radius of curvature of the object-side surface (351) of the fifth lens element (350), $R_{10}$ is the radius of curvature of the image-side surface (352) of the fifth lens element (350), and they satisfy Equation (4) or Equation (12) and Equation (9): $R_4/R_3=-0.36$ and $(R_9-R_{10})/(R_9+R_{10})=0.017$.

The image pick-up optical lens assembly satisfies the following relation (3) or (6), or (8) or (11): $|f/f_3|+|f/f_4|+|f/f_5|=0.26$, $f_5/f_2=-6.16$ and $f/f_3=0.04$, wherein f is the overall focal length of the image pick-up optical lens assembly, $f_1$ is the focal length of the first lens element (310), $f_2$ is the focal length of the second lens element (320), $f_3$ is the focal length of the third lens element (330), $f_4$ is the focal length of the fourth lens element (340), $f_5$ is the focal length of the fifth lens element (350), and data of the foregoing relations are listed in FIG. 25 (which shows Table 17).

From the optical data listed in FIG. 13 (which is Table 5) and the aberration curve as shown in FIG. 3B, good compensation effects of the longitudinal spherical aberration, astigmatic field curving and distortion can be achieved by the image pickup optical lens assembly in accordance with this preferred embodiment of the present invention.

Fourth Preferred Embodiment

Figure 4A:
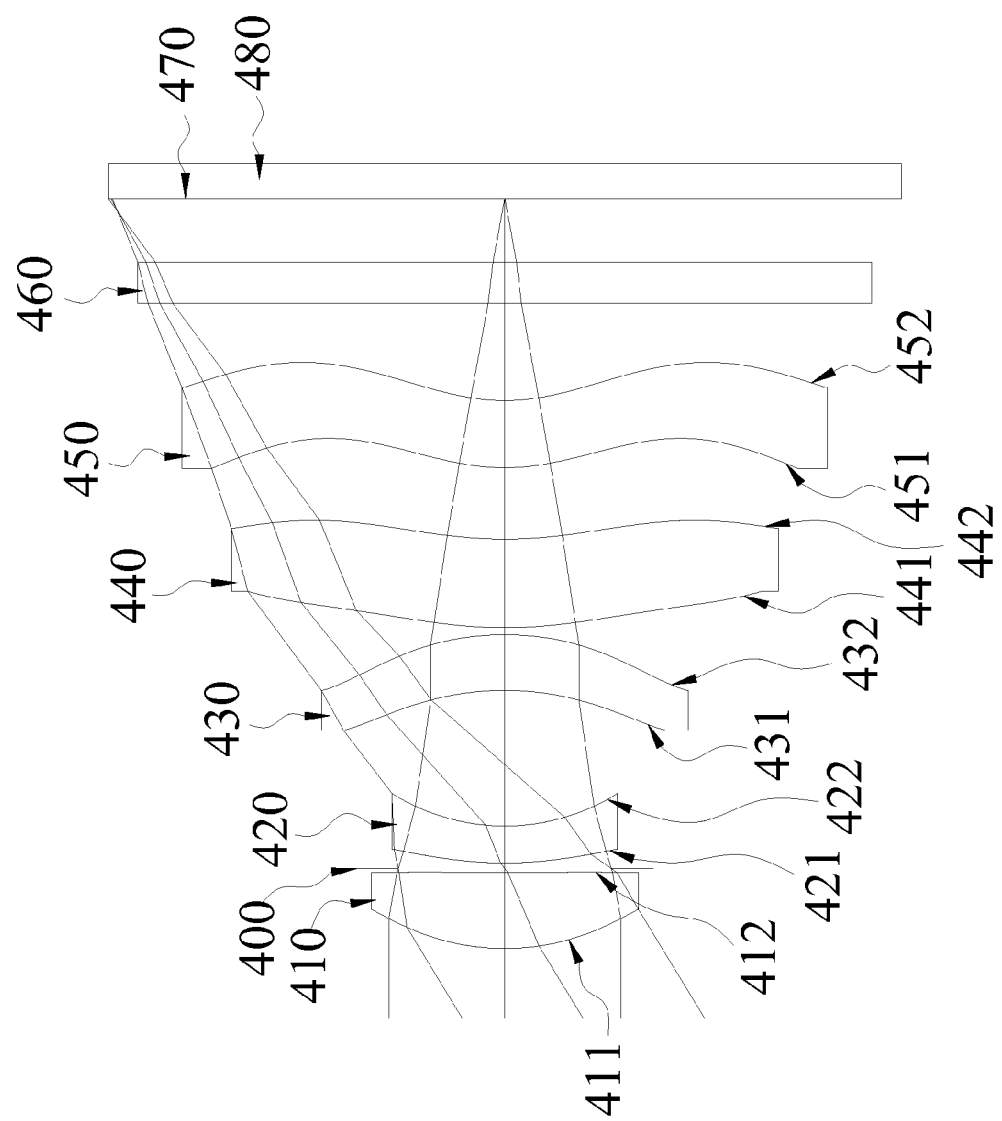
FIG. 4A is a schematic view of an optical lens assembly in accordance with a fourth preferred embodiment of the present invention.
Figure 4B:
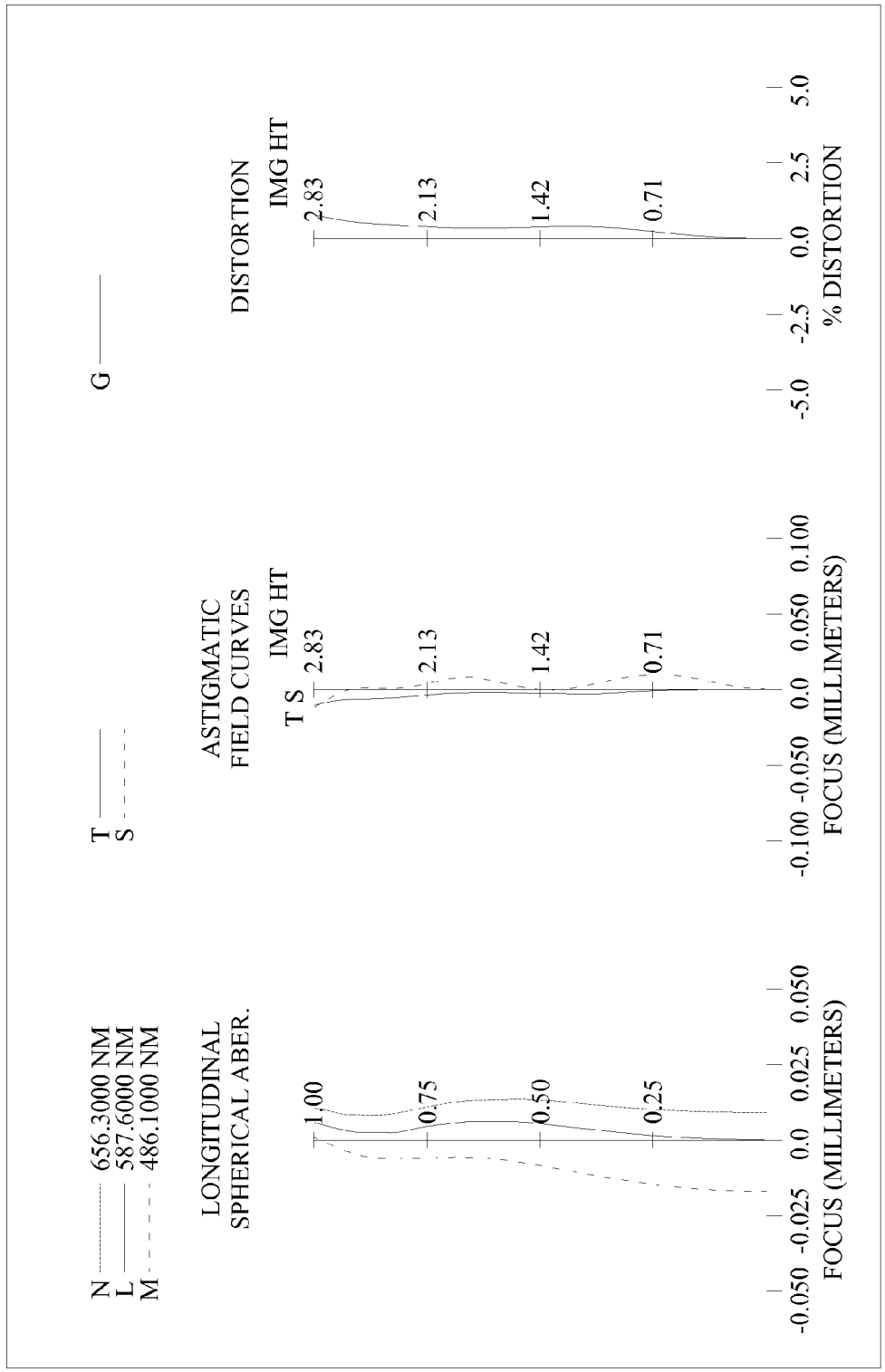
FIG. 4B is a series of aberration curves of the fourth preferred embodiment of the present invention.

With reference to FIGS. 4A and 4B for a schematic view and an aberration curve of an image pick-up optical lens assembly in accordance with the fourth preferred embodiment of the present invention respectively, the image pick-up optical lens assembly comprises five lens elements, and the five lens elements sequentially arranged from an object side to an image side along an optical axis, include: a first lens element (410) with a positive refractive power, which is a plastic lens element having a convex object-side surface (411) and a concave image-side surface (412), and both its object-side surface (411) and image-side surface (412) are aspheric near the optical axis; a second lens element (420) with a negative refractive power, which is a plastic lens element having a convex object-side surface (421) and a concave image-side surface (422), and both object-side surface (421) and image-side surface (422) are aspheric near the optical axis; a third lens element (430) with a positive refractive power, which is a plastic lens element having a concave object-side surface (431) and a convex image-side surface (432), and both object-side surface (431) and image-side surface (432) are aspheric near the optical axis; a fourth lens element (440) with a positive refractive power which is a plastic lens element having a convex object-side surface (441) and a concave image-side surface (442), and both object-side surface (441) and image-side surface (442) are aspheric near the optical axis; a fifth lens element (450) with a positive refractive power, which is a lens element made of a plastic material and has a convex object-side surface (451) and a concave image-side surface (452), and both object-side surface (451) and image-side surface (452) are aspheric near the optical axis, and the image-side surface (452) of the fifth lens element (450) has at least one inflection point. In this preferred embodiment, the image pick-up optical lens assembly further comprises an aperture (400) installed between the first lens element (410) and the second lens element (420). With the aperture (400) and the first lens element (410), second lens element (420), third lens element (430), fourth lens element (440) and fifth lens element (450) arranged on the optical axis, the object to be photographed can be imaged on the image plane (470).

The image pick-up optical lens assembly of this preferred embodiment can be installed in an optical system, and the optical system further comprises an infrared filter (IR-filter) (460) and an image sensor (480), wherein the infrared filter (460) is generally made of a plate glass material without affecting the focal length of the image pick-up optical lens assembly of the present invention, and the image sensor (480) which can be an electronic photosensor installed on an image plane (470) for converting the light of an image electronically.

With reference to FIG. 15 (which shows Table 7) for optical data of this preferred embodiment, the object-side surface (411) and image-side surface (412) of the first lens element (410), the object-side surface (421) and image-side surface (422) of the second lens element (420), the object-side surface (431) and image-side surface (432) of the third lens element (430), the object-side surface (441) and image-side surface (442) of the fourth lens element (440), and the object-side surface (451) and image-side surface (452) of the fifth lens element (450) satisfy the aspherical surface formula as given in Equation (13), and FIG. 16 (which shows Table 8) lists the aspherical surface coefficients.

In the image pickup optical lens assembly of this preferred embodiment, the focal length of the whole image pickup optical system is f=4.63 (mm), the aperture value of the whole image pickup optical system is Fno=2.80, and half of the maximum view angle is HFOV=31.3 (degrees).

With reference to Table 7 for this preferred embodiment, f is the focal length of the image pick-up optical lens assembly, $f_1$ is the focal length of the first lens element (410) on the optical axis, $CT_1$ is the thickness of the first lens element (410) on the optical axis, $CT_2$ is the thickness of the second lens element (420) on the optical axis, and they satisfy the Relations (1) and (2) as follows: $f/f_1=1.40$ and $CT_1/CT_2=2.05$.

In this preferred embodiment, $v_1$ is the Abbe number of the first lens element (410) and $v_2$ is the Abbe number of the second lens element (420) of the image pick-up optical lens assembly, and they satisfy Equation (10): $v_1-v_2=32.1$; $T_d$ is the distance from the object-side surface (411) of the first lens element (410) to the image-side surface (452) of the fifth lens element (450) on the optical axis, f is the focal length of the image pick-up optical lens assembly, and they satisfy Equation (7): $T_d/f=0.85$; $CT_2$ is the thickness of the second lens element (420) on the optical axis, $CT_3$ is the thickness of the third lens element (430) on the optical axis, and they satisfy Equation (5): $(CT_2+CT_3)/f=0.14$; $R_3$ is the radius of curvature of the object-side surface (421) of the second lens element (420), $R_4$ is the radius of curvature of the image-side surface (422) of the second lens element (420), $R_9$ is the radius of curvature of the object-side surface (451) of the fifth lens element (450), $R_{10}$ is the radius of curvature of the image-side surface (452) of the fifth lens element (450), and they satisfy Equation (4) or Equation (12) and Equation (9): $R_4/R_3=0.55$ and $(R_9-R_{10})/(R_9+R_{10})=0.038$.

The image pick-up optical lens assembly satisfies the following relation (3) or (6), or (8) or (11): $|f/f_3|+|f/f_4|+|f/f_5|=0.20$, $f_5/f_2=-12.39$ and $f/f_3=0.08$, wherein f is the overall focal length of the image pick-up optical lens assembly, $f_1$ is the focal length of the first lens element (410), $f_2$ is the focal length of the second lens element (420), $f_3$ is the focal length of the third lens element (430), $f_4$ is the focal length of the fourth lens element (440), $f_5$ is the focal length of the fifth lens element (450), and data of the foregoing relations are listed in FIG. 25 (which shows Table 17).

From the optical data listed in FIG. 15 (which is Table 7) and the aberration curve as shown in FIG. 4B, good compensation effects of the longitudinal spherical aberration, astigmatic field curving and distortion can be achieved by the image pickup optical lens assembly in accordance with this preferred embodiment of the present invention.

Fifth Preferred Embodiment

Figure 5A:
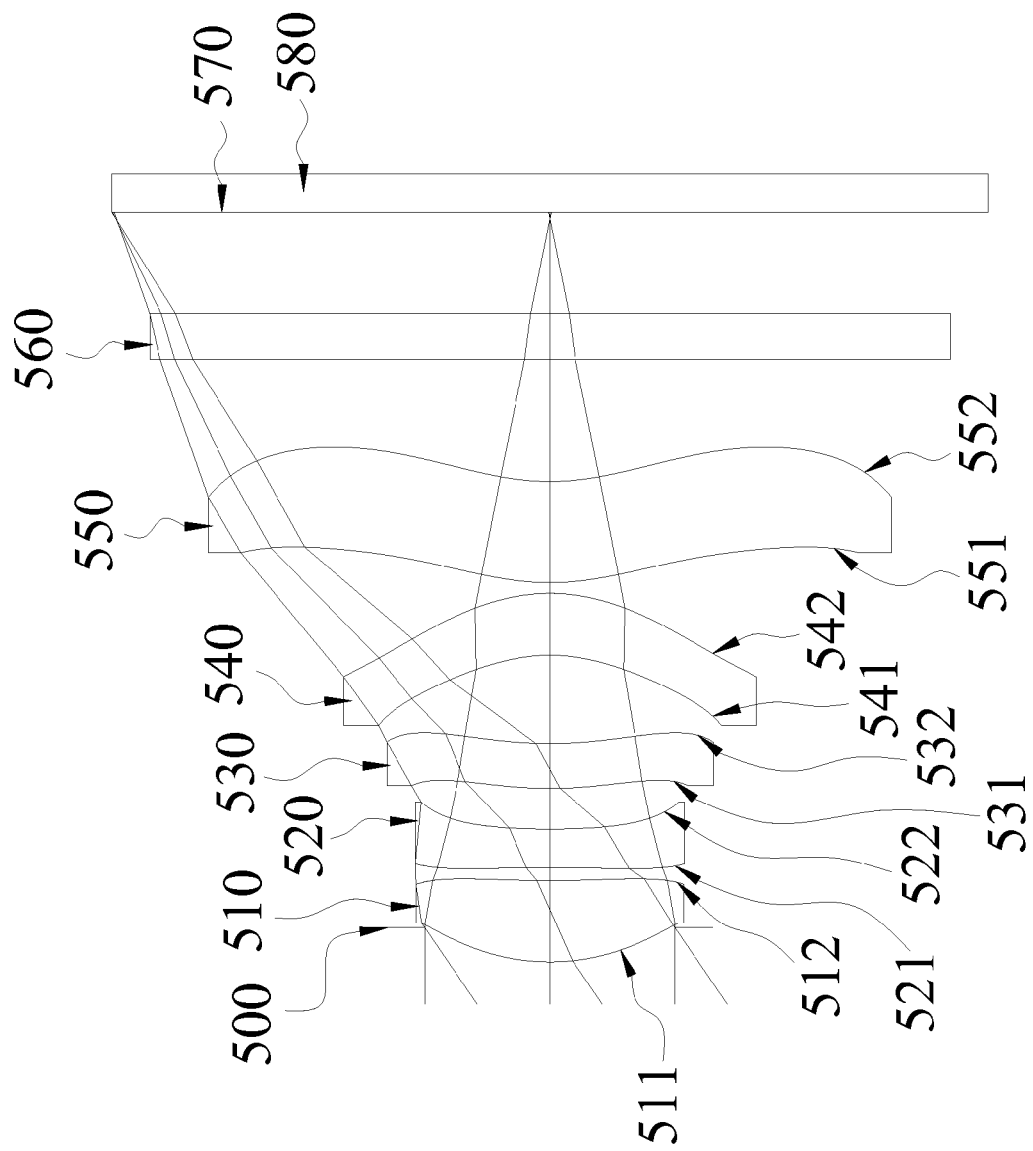
FIG. 5A is a schematic view of an optical lens assembly in accordance with a fifth preferred embodiment of the present invention.
Figure 5B:
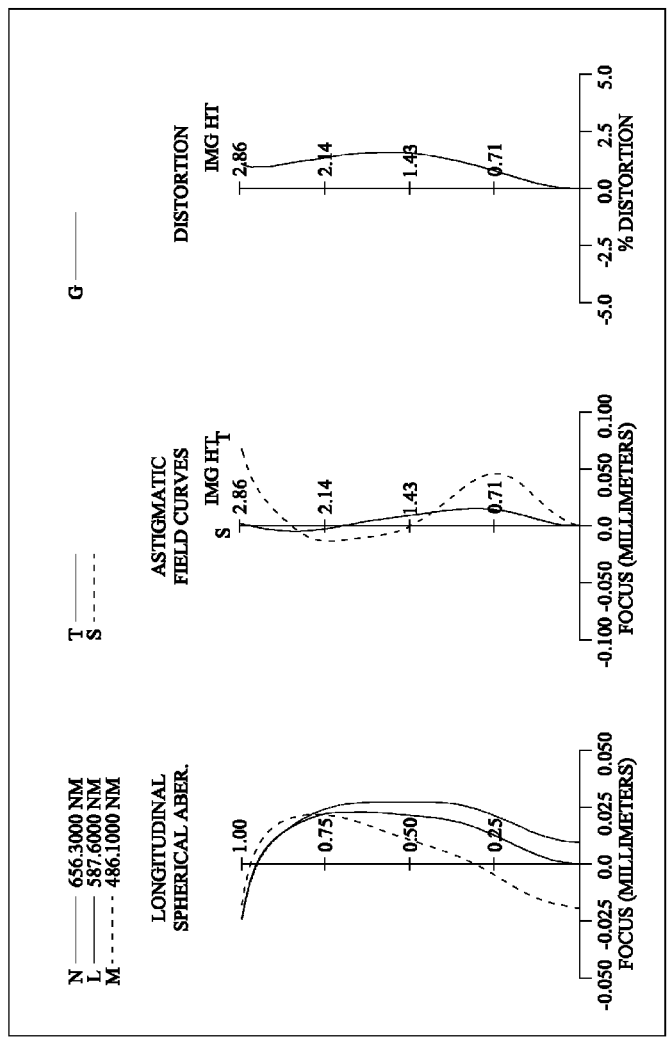
FIG. 5B is a series of aberration curves of the fifth preferred embodiment of the present invention.

With reference to FIGS. 5A and 5B for a schematic view and an aberration curve of an image pick-up optical lens assembly in accordance with the fifth preferred embodiment of the present invention respectively, the image pick-up optical lens assembly comprises five lens elements, and the five lens elements sequentially arranged from an object side to an image side along an optical axis, include: a first lens element (510) with a positive refractive power, which is a plastic lens element having a convex object-side surface (511) and a concave image-side surface (512), and both object-side surface (511) and image-side surface (512) are aspheric near the optical axis; a second lens element (520) with a negative refractive power, which is a plastic lens element having a concave object-side surface (521) and a concave image-side surface (522), and both object-side surface (521) and image-side surface (522) are aspheric near the optical axis; a third lens element (530) with a positive refractive power, which is a plastic lens element having a convex object-side surface (531) and a concave image-side surface (532), and both object-side surface (531) and image-side surface (532) are aspheric near the optical axis; a fourth lens element (540) with a positive refractive power which is a plastic lens element having a concave object-side surface (541) and a convex image-side surface (542), and both object-side surface (541) and image-side surface (542) are aspheric near the optical axis; a fifth lens element (550) with a positive refractive power, which is a lens element made of a plastic material and has a convex object-side surface (551) and a concave image-side surface (552), and both object-side surface (551) and image-side surface (552) are aspheric near the optical axis, and the image-side surface (552) of the fifth lens element (550) has at least one inflection point. In this preferred embodiment, the image pickup optical lens assembly further comprises an aperture (500) installed between the first lens element (510) and the object to be photographed. With the aperture (500) and the first lens element (510), second lens element (520), third lens element (530), fourth lens element (540) and fifth lens element (550) arranged on the optical axis, the object to be photographed can be imaged on the image plane (570).

The image pick-up optical lens assembly of this preferred embodiment can be installed in an optical system, and the optical system further comprises an infrared filter (IR-filter) (560) and an image sensor (580), wherein the infrared filter (560) is generally made of a plate glass material without affecting the focal length of the image pickup optical lens assembly of the present invention, and the image sensor (580) which can be an electronic photosensor installed on an image plane (570) for converting the light of an image electronically.

With reference to FIG. 17 (which shows Table 9) for optical data of this preferred embodiment, the object-side surface (511) and image-side surface (512) of the first lens element (510), the object-side surface (521) and image-side surface (522) of the second lens element (520), the object-side surface (531) and image-side surface (532) of the third lens element (530), the object-side surface (541) and image-side surface (542) of the fourth lens element (540), and the object-side surface (551) and image-side surface (552) of the fifth lens element (550) satisfy the aspherical surface formula as given in Equation (13), and FIG. 18 (which shows Table 10) lists the aspherical surface coefficients.

In the image pickup optical lens assembly of this preferred embodiment, the focal length of the whole image pickup optical system is f=4.12 (mm), the aperture value of the whole image pickup optical system is Fno=2.52, and half of the maximum view angle is HFOV=34.4 (degrees).

With reference to Table 9 for this preferred embodiment, f is the focal length of the image pick-up optical lens assembly, f1 is the focal length of the first lens element (510) on the optical axis, CT1 is the thickness of the first lens element (510) on the optical axis, CT2 is the thickness of the second lens element (520) on the optical axis, and they satisfy the Relations (1) and (2) as follows: f/f1=1.34 and CT1/CT2=2.11.

In this preferred embodiment, $v_1$ is the Abbe number of the first lens element (510) and $v_2$ is the Abbe number of the second lens element (520) of the image pick-up optical lens assembly, and they satisfy Equation (10): $v_1-v_2$=32.1; $T_d$ is the distance from the object-side surface (511) of the first lens element (510) to the image-side surface (552) of the fifth lens element (550) on the optical axis, f is the focal length of the image pick-up optical lens assembly, and they satisfy Equation (7): $T_d/f$=0.76; $CT_2$ is the thickness of the second lens element (520) on the optical axis, $CT_3$ is the thickness of the third lens element (530) on the optical axis, and they satisfy Equation (5): $(CT_2+CT_3)/f$=0.13; $R_3$ is the radius of curvature of the object-side surface (521) of the second lens element (520), $R_4$ is the radius of curvature of the image-side surface (522) of the second lens element (520), $R_9$ is the radius of curvature of the object-side surface (551) of the fifth lens element (550), $R_{10}$ is the radius of curvature of the image-side surface (552) of the fifth lens element (550), and they satisfy Equation (4) or Equation (12) and Equation (9): $R_4/R_3$=−0.35 and $(R_9-R_{10})/(R_9+R_{10})$=0.023.

The image pick-up optical lens assembly satisfies the following relation (3) or (6), or (8) or (11): $|f/f_3|+|f/f_4|+|f/f_5|$=0.32, $f_5/f_2$=−5.52 and $f/f_3$=0.09, wherein f is the overall focal length of the image pickup optical lens assembly, $f_1$ is the focal length of the first lens element (510), $f_2$ is the focal length of the second lens element (520), $f_3$ is the focal length of the third lens element (530), $f_4$ is the focal length of the fourth lens element (540), $f_5$ is the focal length of the fifth lens element (550), and data of the foregoing relations are listed in FIG. 25 (which shows Table 17).

From the optical data listed in FIG. 17 (which is Table 9) and the aberration curve as shown in FIG. 5B, good compensation effects of the longitudinal spherical aberration, astigmatic field curving and distortion can be achieved by the image pickup optical lens assembly in accordance with this preferred embodiment of the present invention.

Sixth Preferred Embodiment

Figure 6A:
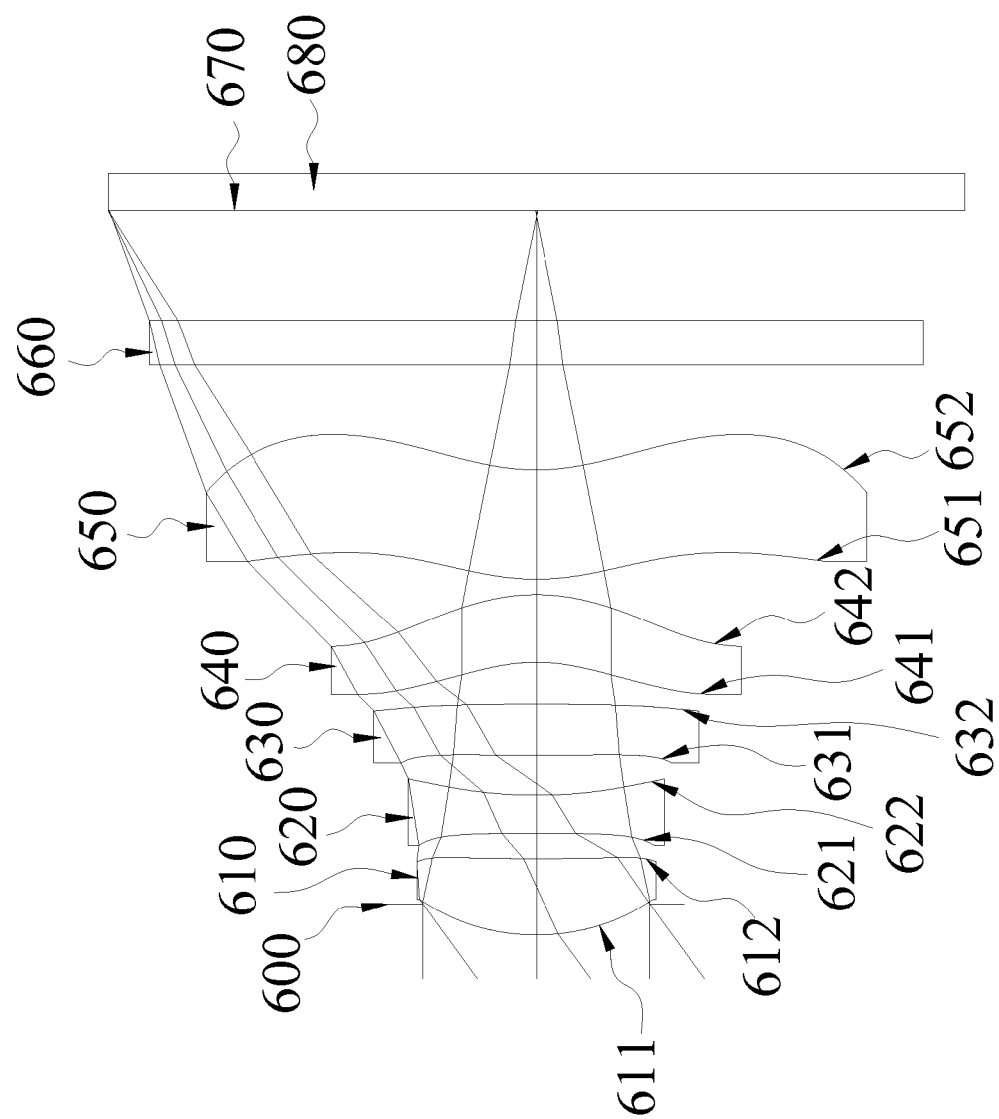
FIG. 6A is a schematic view of an optical lens assembly in accordance with a sixth preferred embodiment of the present invention.
Figure 6B:
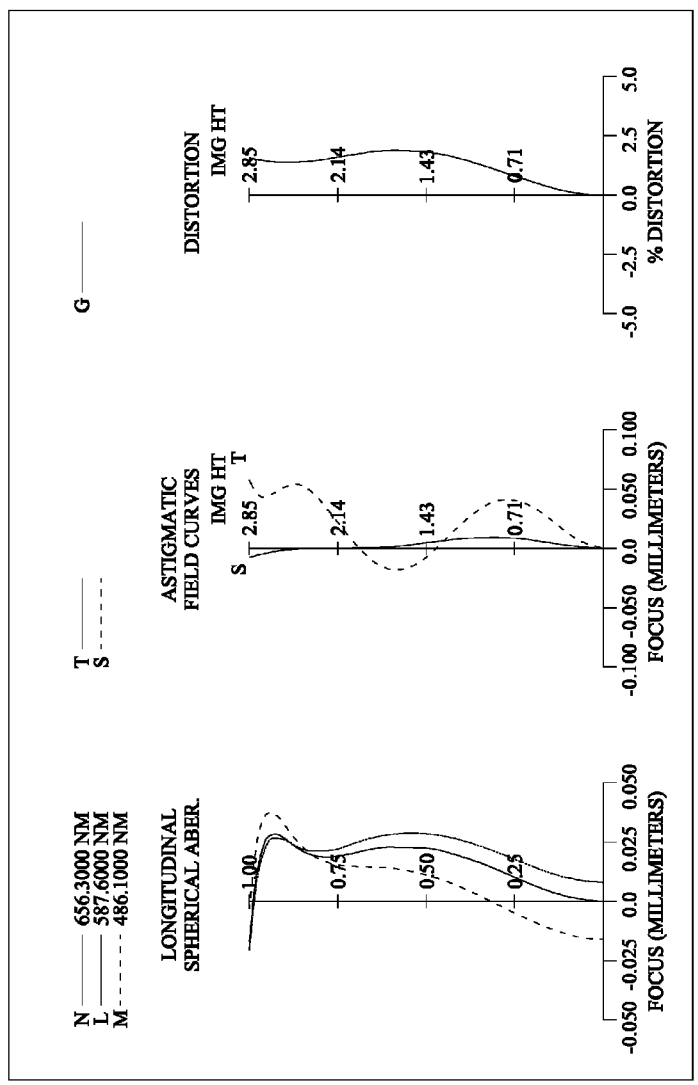
FIG. 6B is a series of aberration curves of the sixth preferred embodiment of the present invention.

With reference to FIGS. 6A and 6B for a schematic view and an aberration curve of an image pick-up optical lens assembly in accordance with the sixth preferred embodiment of the present invention respectively, the image pick-up optical lens assembly comprises five lens elements, and the five lens elements sequentially arranged from an object side to an image side along an optical axis, include: a first lens element (610) with a positive refractive power, which is a plastic lens element having a convex object-side surface (611) and a concave image-side surface (612), and both object-side surface (611) and image-side surface (612) are aspheric near the optical axis; a second lens element with a negative refractive power (620), which is a plastic lens element having a concave object-side surface (621) and a concave image-side surface (622), and both object-side surface (621) and image-side surface (622) are aspheric near the optical axis; a third lens element with a positive refractive power (630), which is a bi-convex lens element made of a plastic material, and both object-side surface (631) and image-side surface (632) of the third lens element (630) are aspheric; a fourth lens element (640) with a positive refractive power which is a plastic lens element having a concave object-side surface (641) and a convex image-side surface (642), and both object-side surface (641) and image-side surface (642) are aspheric near the optical axis; a fifth lens element (650) with a positive refractive power, which is a plastic lens element having a convex object-side surface (651) and a concave image-side surface (652), and both object-side surface (651) and image-side surface (652) are aspheric near the optical axis, and the image-side surface (652) of the fifth lens element (650) has at least one inflection point. In this preferred embodiment, the image pick-up optical lens assembly further comprises an aperture (600) installed between the first lens element (610) and the object to be photographed. With the aperture (600) and the first lens element (610), second lens element (620), third lens element (630), fourth lens element (640) and fifth lens element (650) arranged on the optical axis, the object to be photographed can be imaged on the image plane (670).

The image pick-up optical lens assembly of this preferred embodiment can be installed in an optical system, and the optical system further comprises an infrared filter (IR-filter) (660) and an image sensor (680), wherein the infrared filter (660) is generally made of a plate glass material without affecting the focal length of the image pick-up optical lens assembly of the present invention, and the image sensor (680) which can be an electronic photosensor installed on an image plane (670) for converting the light of an image electronically.

With reference to FIG. 19 (which shows Table 11) for optical data of this preferred embodiment, the object-side surface (611) and image-side surface (612) of the first lens element (610), the object-side surface (621) and image-side surface (622) of the second lens element (620), the object-side surface (631) and image-side surface (632) of the third lens element (630), the object-side surface (641) and image-side surface (642) of the fourth lens element (640), and the object-side surface (651) and image-side surface (652) of the fifth lens element (650) satisfy the aspherical surface formula as given in Equation (13), and FIG. 20 (which shows Table 12) lists the aspherical surface coefficients.

In the image pickup optical lens assembly of this preferred embodiment, the focal length of the whole image pickup optical system is f=3.87 (mm), the aperture value of the whole image pickup optical system is Fno=2.55, and half of the maximum view angle is HFOV=35.9 (degrees).

With reference to Table 11 for this preferred embodiment, f is the focal length of the image pick-up optical lens assembly, $f_1$ is the focal length of the first lens element (610) on the optical axis, $CT_1$ is the thickness of the first lens element (610) on the optical axis, $CT_2$ is the thickness of the second lens element (620) on the optical axis, and they satisfy the Relations (1) and (2) as follows: $f/f_1$=1.37 and $CT_1/CT_2$=2.03.

In this preferred embodiment, $v_1$ is the Abbe number of the first lens element (610) and $v_2$ is the Abbe number of the second lens element (620) of the image pick-up optical lens assembly, and they satisfy Equation (10): $v_1-v_2$=32.5; $T_d$ is the distance from the object-side surface (611) of the first lens element (610) to the image-side surface (652) of the fifth lens element (650) on the optical axis, f is the focal length of the image pick-up optical lens assembly, and they satisfy Equation (7): $T_d/f$=0.80; $CT_2$ is the thickness of the second lens element (620) on the optical axis, $CT_3$ is the thickness of the third lens element (630) on the optical axis, and they satisfy Equation (5): $(CT_2+CT_3)/f$=0.15; $R_3$ is the radius of curvature of the object-side surface (621) of the second lens element (620), $R_4$ is the radius of curvature of the image-side surface (622) of the second lens element (620), $R_9$ is the radius of curvature of the object-side surface (651) of the fifth lens element (650), $R_{10}$ is the radius of curvature of the image-side surface (652) of the fifth lens element (650), and they satisfy Equation (4) or Equation (12) and Equation (9): $R_4/R_3$=−0.23 and $(R_9-R_{10})/(R_9+R_{10})$=0.034.

The image pick-up optical lens assembly satisfies the following relation (3) or (6), or (8) or (11): $|f/f_3|+|f/f_4|+|f/f_5|$=0.38, $f_4/f_2$=−7.05 and $f/f_3$=0.31, wherein f is the overall focal length of the image pick-up optical lens assembly, $f_1$ is the focal length of the first lens element (610), $f_2$ is the focal length of the second lens element (620), $f_3$ is the focal length of the third lens element (630), $f_4$ is the focal length of the fourth lens element (640), $f_5$ is the focal length of the fifth lens element (650), and data of the foregoing relations are listed in FIG. 25 (which shows Table 17).

From the optical data listed in FIG. 19 (which is Table 11) and the aberration curve as shown in FIG. 6B, good compensation effects of the longitudinal spherical aberration, astigmatic field curving and distortion can be achieved by the image pickup optical lens assembly in accordance with this preferred embodiment of the present invention.

Seventh Preferred Embodiment

Figure 7A:
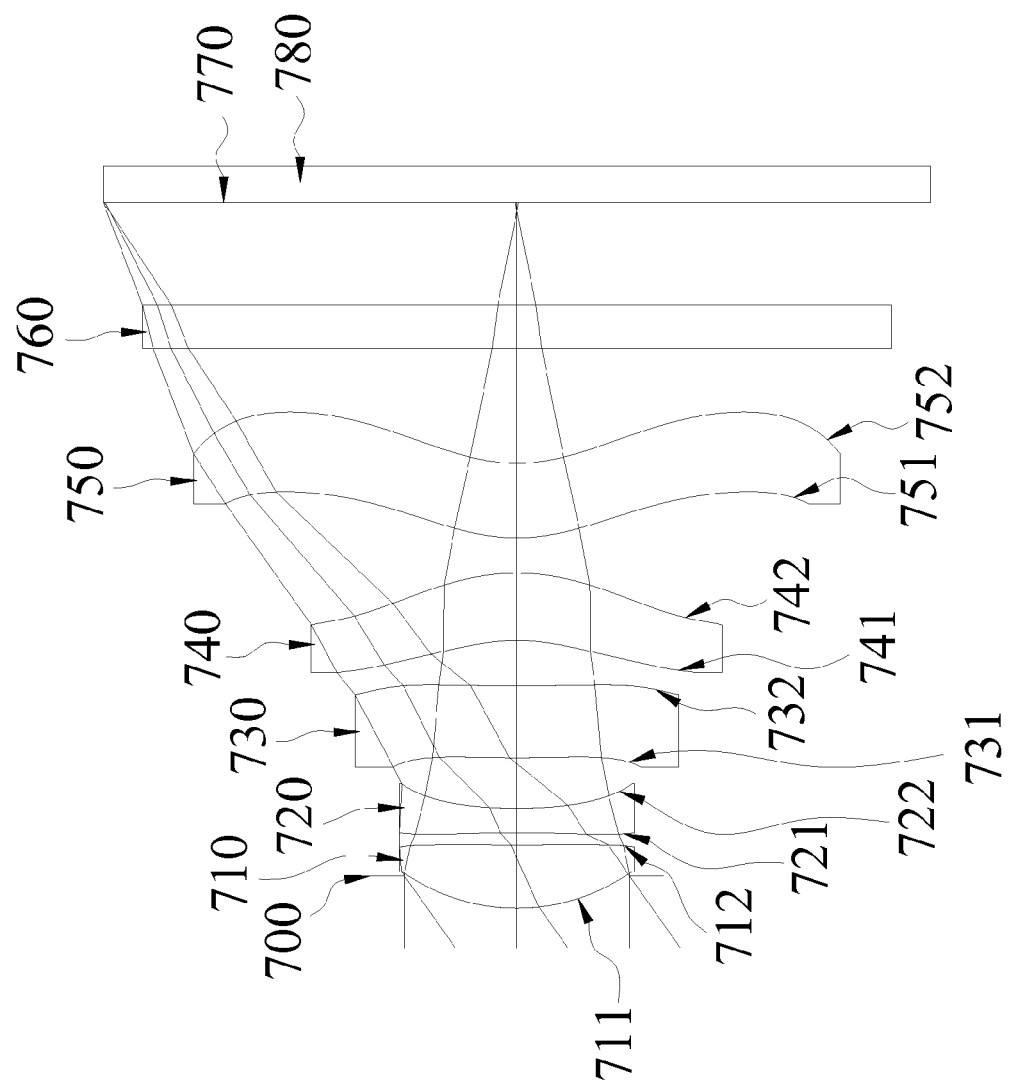
FIG. 7A is a schematic view of an optical lens assembly in accordance with a seventh preferred embodiment of the present invention.
Figure 7B:
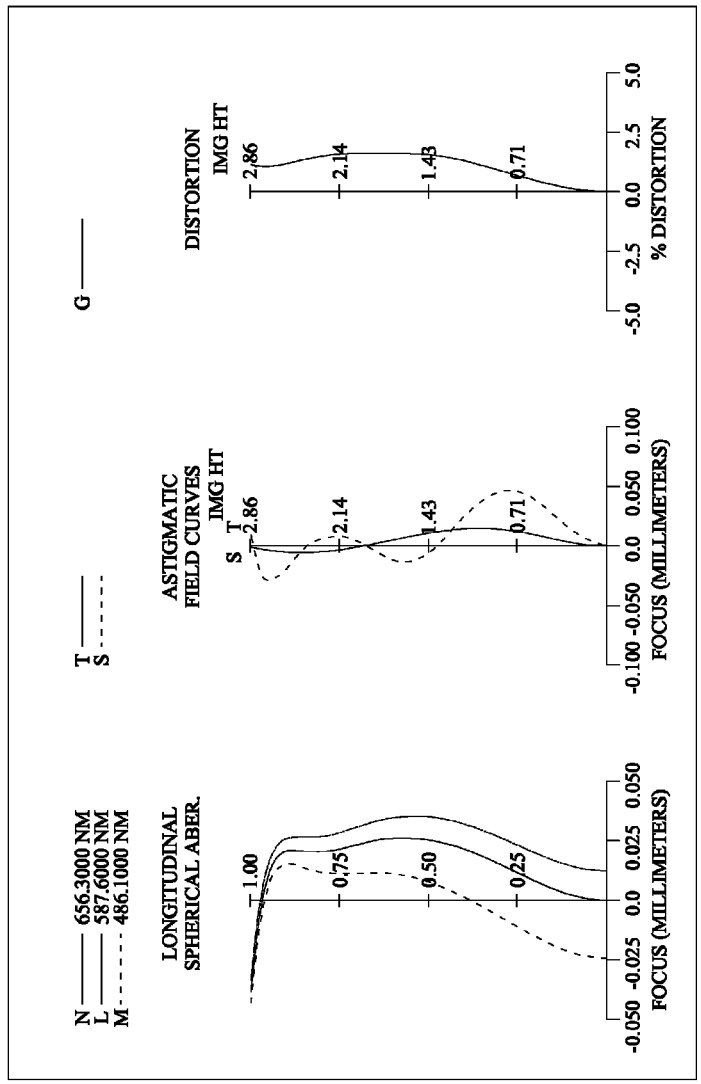
FIG. 7B is a series of aberration curves of the seventh preferred embodiment of the present invention.

With reference to FIGS. 7A and 7B for a schematic view and an aberration curve of an image pick-up optical lens assembly in accordance with the seventh preferred embodiment of the present invention respectively, the image pick-up optical lens assembly comprises five lens elements, and the five lens elements sequentially arranged from an object side to an image side along an optical axis, include: a first lens element (710) with a positive refractive power, which is a lens element made of a glass material and has a convex object-side surface (711) and a concave image-side surface (712), and both object-side surface (711) and image-side surface (712) are aspheric near the optical axis; a second lens element with a negative refractive power (720), which is a lens element made of a plastic material and has a concave object-side surface (721) and a concave image-side surface (722), and both object-side surface (721) and image-side surface (722) are aspheric near the optical axis; a third lens element with a positive refractive power (730), which is a lens element made of a plastic material and has a convex object-side surface (731) and a concave image-side surface (732), and both object-side surface (731) and image-side surface (732) are aspheric near the optical axis; a fourth lens element (740) with a positive refractive power which is a lens element made of a plastic material, and has a concave object-side surface (741) and a convex image-side surface (742), and both object-side surface (741) and image-side surface (742) are aspheric near the optical axis; a fifth lens element (750) with a positive refractive power, which is a lens element made of a plastic material and has a convex object-side surface (751) and a concave image-side surface (752), and both object-side surface (751) and image-side surface (752) are aspheric near the optical axis, and the image-side surface (752) of the fifth lens element (750) has at least one inflection point. In this preferred embodiment, the image pick-up optical lens assembly further comprises an aperture (700) installed between the first lens element (710) and the object to be photographed. With the aperture (700) and the first lens element (710), second lens element (720), third lens element (730), fourth lens element (740) and fifth lens element (750) arranged on the optical axis, the object to be photographed can be imaged on the image plane (770).

The image pick-up optical lens assembly of this preferred embodiment can be installed in an optical system, and the optical system further comprises an infrared filter (IR-filter) (760) and an image sensor (780), wherein the infrared filter (760) is generally made of a plate glass material without affecting the focal length of the image pick-up optical lens assembly of the present invention, and the image sensor (780) which can be an electronic photosensor is installed on an image plane (770) for converting the light of an image into an electronic signal to be transmitted to the outside.

With reference to FIG. 21 (which shows Table 13) for optical data of this preferred embodiment, the object-side surface (711) and image-side surface (712) of the first lens element (710), the object-side surface (721) and image-side surface (722) of the second lens element (720), the object-side surface (731) and image-side surface (732) of the third lens element (730), the object-side surface (741) and image-side surface (742) of the fourth lens element (740), and the object-side surface (751) and image-side surface (752) of the fifth lens element (750) satisfy the aspherical surface formula as given in Equation (13), and FIG. 22 (which shows Table 14) lists the aspherical surface coefficients.

In the image pickup optical lens assembly of this preferred embodiment, the focal length of the whole image pickup optical system is f=3.98 (mm), the aperture value of the whole image pickup optical system is Fno=2.55, and half of the maximum view angle is HFOV=35.2 (degrees).

With reference to Table 13 for this preferred embodiment, f is the focal length of the image pick-up optical lens assembly, $f_1$ is the focal length of the first lens element (710) on the optical axis, $CT_1$ is the thickness of the first lens element (710) on the optical axis, $CT_2$ is the thickness of the second lens element (720) on the optical axis, and they satisfy the Relations (1) and (2) as follows: $f/f_1$=1.60 and $CT_1/CT_2$=2.59.

In this preferred embodiment, $v_1$ is the Abbe number of the first lens element (710) and $v_2$ is the Abbe number of the second lens element (720) of the image pick-up optical lens assembly, and they satisfy Equation (10): $v_1-v_2$=19.4; $T_d$ is the distance from the object-side surface (711) of the first lens element (710) to the image-side surface (752) of the fifth lens element (750) on the optical axis, f is the focal length of the image pick-up optical lens assembly, and they satisfy Equation (7): $T_d/f$=0.78; $CT_2$ is the thickness of the second lens element (720) on the optical axis, $CT_3$ is the thickness of the third lens element (730) on the optical axis, and they satisfy Equation (5): $(CT_2+CT_3)/f$=0.17; $R_3$ is the radius of curvature of the object-side surface (721) of the second lens element (720), $R_4$ is the radius of curvature of the image-side surface (722) of the second lens element (720), $R_9$ is the radius of curvature of the object-side surface (751) of the fifth lens element (750), $R_{10}$ is the radius of curvature of the image-side surface (752) of the fifth lens element (750), and they satisfy Equation (4) or Equation (12) and Equation (9): $R_4/R_3$=−0.31 and $(R_9-R_{10})/(R_9+R_{10})$=0.037.

The image pick-up optical lens assembly satisfies the following relation (3) or (6), or (8) or (11): $|f/f_3|+|f/f_4|+|f/f_5|$=0.38, $f_5/f_2$=−8.06 and $f/f_3$=0.17, wherein f is the overall focal length of the image pick-up optical lens assembly, $f_1$ is the focal length of the first lens element (710), $f_2$ is the focal length of the second lens element (720), $f_3$ is the focal length of the third lens element (730), $f_4$ is the focal length of the fourth lens element (740), $f_5$ is the focal length of the fifth lens element (750), and data of the foregoing relations are listed in FIG. 25 (which shows Table 17).

From the optical data listed in FIG. 21 (which is Table 13) and the aberration curve as shown in FIG. 7B, good compensation effects of the longitudinal spherical aberration, astigmatic field curving and distortion can be achieved by the image pickup optical lens assembly in accordance with this preferred embodiment of the present invention.

Eighth Preferred Embodiment

Figure 8A:
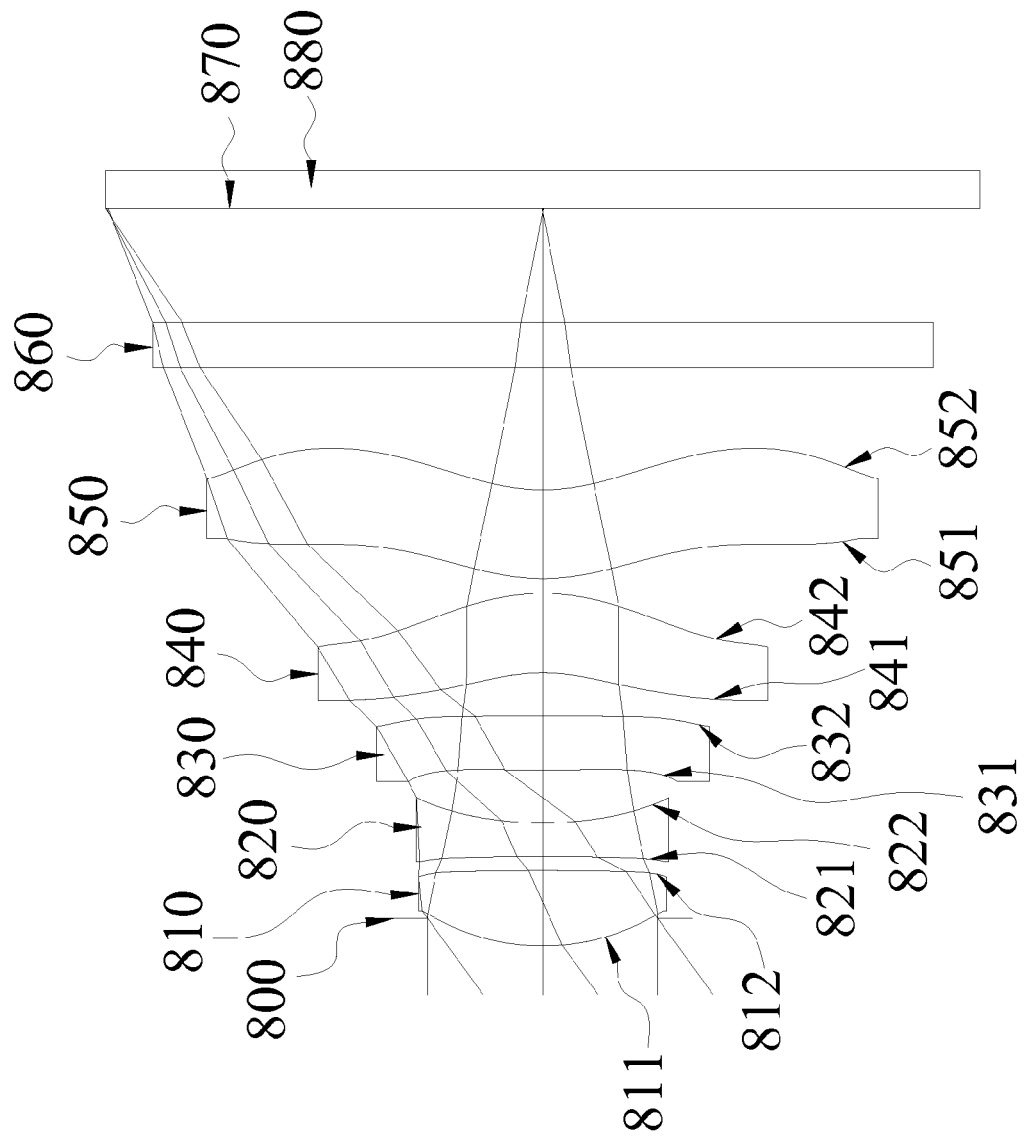
FIG. 8A is a schematic view of an optical lens assembly in accordance with an eighth preferred embodiment of the present invention.
Figure 8B:
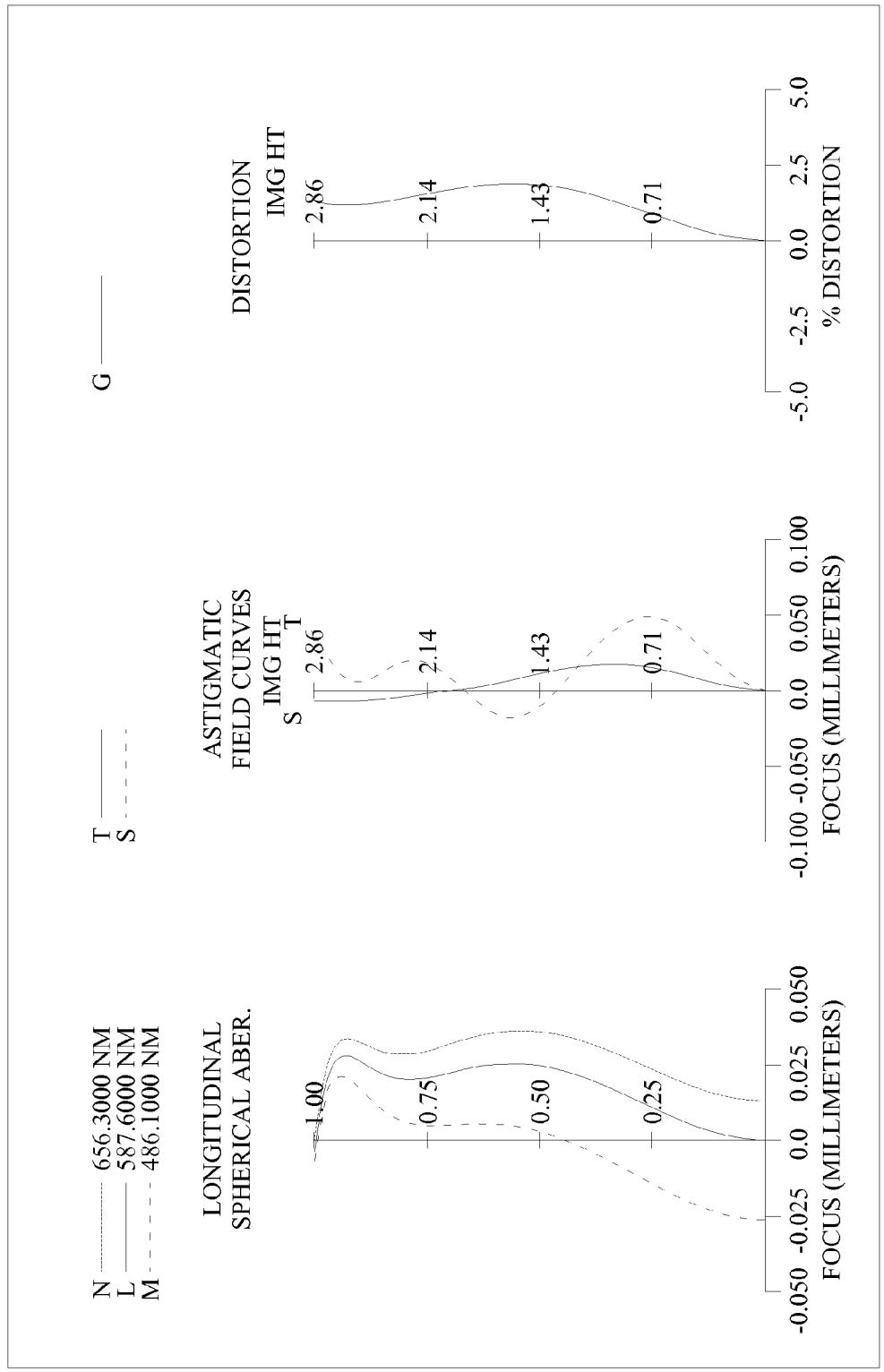
FIG. 8B is a series of aberration curves of the eighth preferred embodiment of the present invention.

With reference to FIGS. 8A and 8B for a schematic view and an aberration curve of an image pick-up optical lens assembly in accordance with the eighth preferred embodiment of the present invention respectively, the image pick-up optical lens assembly comprises five lens elements, and the five lens elements sequentially arranged from an object side to an image side along an optical axis, include: a first lens element (810) with a positive refractive power, which is a bi-convex lens element made of a glass material and has an aspheric object-side surface (811) and an aspheric image-side surface (812); a second lens element with a negative refractive power (820), which is a lens element made of a plastic material and has a concave object-side surface (821) and a concave image-side surface (822), and both object-side surface (821) and image-side surface (822) are aspheric near the optical axis; a third lens element with a positive refractive power (830), which is a bi-convex lens element made of a plastic material and has an aspheric object-side surface (831) and an aspheric image-side surface (832); a fourth lens element (840) with a positive refractive power which is a lens element made of a plastic material, and has a concave object-side surface (841) and a convex image-side surface (842), and both object-side surface (841) and image-side surface (842) are aspheric near the optical axis; a fifth lens element (850) with a positive refractive power, which is a lens element made of a plastic material and has a convex object-side surface (851) and a concave image-side surface (852), and both object-side surface (851) and image-side surface (852) are aspheric near the optical axis, and the image-side surface (852) of the fifth lens element (850) has at least one inflection point. In this preferred embodiment, the image pick-up optical lens assembly further comprises an aperture (800) installed between the first lens element (810) and the object to be photographed. With the aperture (800) and the first lens element (810), second lens element (820), third lens element (830), fourth lens element (840) and fifth lens element (850) arranged on the optical axis, the object to be photographed can be imaged on the image plane (870).

The image pick-up optical lens assembly of this preferred embodiment can be installed in an optical system, and the optical system further comprises an infrared filter (IR-filter) (860) and an image sensor (880), wherein the infrared filter (860) is generally made of a plate glass material without affecting the focal length of the image pick-up optical lens assembly of the present invention, and the image sensor (880) which can be an electronic photosensor is installed on an image plane (870) for converting the light of an image into an electronic signal to be transmitted to the outside.

With reference to FIG. 23 (which shows Table 15) for optical data of this preferred embodiment, the object-side surface (811) and image-side surface (812) of the first lens element (810), the object-side surface (821) and image-side surface (822) of the second lens element (820), the object-side surface (831) and image-side surface (832) of the third lens element (830), the object-side surface (841) and image-side surface (842) of the fourth lens element (840), and the object-side surface (851) and image-side surface (852) of the fifth lens element (850) satisfy the aspherical surface formula as given in Equation (13), and FIG. 24 (which shows Table 16) lists the aspherical surface coefficients.

In the image pickup optical lens assembly of this preferred embodiment, the focal length of the whole image pickup optical system is f=3.87 (mm), the aperture value of the whole image pickup optical system is Fno=2.57, and half of the maximum view angle is HFOV=36.0 (degrees).

With reference to Table 15 for this preferred embodiment, f is the focal length of the image pick-up optical lens assembly, $f_1$ is the focal length of the first lens element (810) on the optical axis, $CT_1$ is the thickness of the first lens element (810) on the optical axis, $CT_2$ is the thickness of the second lens element (820) on the optical axis, and they satisfy the Relations (1) and (2) as follows: $f/f_1$=1.61 and $CT_1/CT_2$=2.25.

In this preferred embodiment, $v_1$ is the Abbe number of the first lens element (810) and $v_2$ is the Abbe number of the second lens element (820) of the image pick-up optical lens assembly, and they satisfy Equation (10): $v_1-v_2$=19.4; $T_d$ is the distance from the object-side surface (811) of the first lens element (810) to the image-side surface (852) of the fifth lens element (850) on the optical axis, f is the focal length of the image pick-up optical lens assembly, and they satisfy Equation (7): $T_d/f$=0.77; $CT_2$ is the thickness of the second lens element (820) on the optical axis, $CT_3$ is the thickness of the third lens element (830) on the optical axis, and they satisfy Equation (5): $(CT_2+CT_3)/f$=0.15; $R_3$ is the radius of curvature of the object-side surface (821) of the second lens element (820), $R_4$ is the radius of curvature of the image-side surface (822) of the second lens element (820), $R_9$ is the radius of curvature of the object-side surface (851) of the fifth lens element (850), $R_{10}$ is the radius of curvature of the image-side surface (852) of the fifth lens element (850), and they satisfy Equation (4) or Equation (12) and Equation (9): $R_4/R_3$=−0.18 and $(R_9-R_{10})/(R_9+R_{10})$=0.038.

The image pick-up optical lens assembly satisfies the following relation (3) or (6), or (8) or (11): $|f/f_3|+|f/f_4|+|f/f_5|$=0.48, $f_5/f_2$=−8.90 and $f/f_3$=0.31, wherein f is the overall focal length of the image pick-up optical lens assembly, $f_1$ is the focal length of the first lens element (810), $f_2$ is the focal length of the second lens element (820), $f_3$ is the focal length of the third lens element (830), $f_4$ is the focal length of the fourth lens element (840), $f_5$ is the focal length of the fifth lens element (850), and data of the foregoing relations are listed in FIG. 25 (which shows Table 17).

From the optical data listed in FIG. 23 (which is Table 15) and the aberration curve as shown in FIG. 8B, good compensation effects of the longitudinal spherical aberration, astigmatic field curving and distortion can be achieved by the image pickup optical lens assembly in accordance with this preferred embodiment of the present invention.

In the image pick-up optical lens assembly of the present invention, the lens can be made of a glass or plastic material. If the lens is made of a glass material, the refractive power of the image pickup optical lens assembly can be selected more flexibly. If the lens is made of a plastic material, the production cost can be reduced effectively. In addition, an aspherical surface is formed on an optical surface of the lens, and the aspherical surface can be easily manufactured into a shape other than that of a spherical surface to have more control factors to eliminate or reduce aberrations, so as to reduce the number of lenses used and the total length of the image pickup optical lens assembly of the present invention.

In the image pick-up optical lens assembly of the present invention, if the lens surface is a convex surface, the lens surface proximate to the optical axis is convex; and if the lens surface is a concave surface, the lens surface proximate to the optical axis is concave.

In the image pickup optical system of the present invention, at least one stop such as a glare stop or a field stop (not shown in the figure) can be provided for reducing stray lights and improving the image quality.

Tables 1 to 16 (corresponding to FIGS. 9 to 24 respectively) show changes of values of an image pickup optical system in accordance with a preferred embodiment of the present invention. However, the changes of values in the preferred embodiments of the present invention are obtained from experiments. Even if different values are used, products of the same structure are intended to be covered by the scope of the present invention. Therefore, the aforementioned description and the illustration of related drawings are illustrative, but not intended for limiting the scope of the present invention.

What is claimed is:

1. An image pick-up optical lens assembly, sequentially arranged from an object side to an image side along an optical axis, comprising:
   a first lens element with a positive refractive power, having a convex object-side surface;
   a second lens element with a negative refractive power;
   a third lens element with a positive refractive power;
   a fourth lens element with a positive refractive power, being a meniscus lens element, and at least one of the object-side and image-side surfaces being aspheric;
   a fifth lens element with a positive refractive power, having a convex object-side surface and a concave image-side surface, and at least one of the object-side and image-side surfaces being aspheric, and the image-side surface of the fifth lens element having at least one inflection point;
   wherein, f is the focal length of the image pick-up optical lens assembly, $f_1$ is the focal length of the first lens element, $CT_1$ is the thickness of the first lens element on the optical axis, $CT_2$ is the thickness of the second lens element on the optical axis, and the relation of $0.7<f/f_1<2.0$ and $0.8<CT_1/CT_2<2.80$ are satisfied, wherein $R_3$ is the radius of curvature of the object-side surface of the second lens element, $R_4$ is the radius of curvature of the image-side surface of the second lens element, and the relation of $-0.5<R_4/R_3<0.5$ is satisfied.

2. The image pick-up optical lens assembly of claim 1, wherein the second lens element has a concave image-side surface, and the fifth lens element is made of plastic material.

3. The image pick-up optical lens assembly of claim 2, wherein f is the focal length of the image pick-up optical lens assembly, $f_3$ is the focal length of the third lens element, $f_4$ is the focal length of the fourth lens element, $f_5$ is the focal length of the fifth lens element, and the relation of $|f/f_3|+|f/f_4|+|f/f_5|<0.90$ is satisfied.

4. The image pick-up optical lens assembly of claim 3, wherein f is the focal length of the image pick-up optical lens assembly, $T_d$ is the distance from the object-side surface of the first lens element to the image-side surface of the fifth lens element on the optical axis, and the relation of $0.65<T_d/f<0.95$ is satisfied.

5. The image pick-up optical lens assembly of claim 3, wherein the second lens element has a concave object-side surface.

6. The image pick-up optical lens assembly of claim 3, wherein $f_2$ is the focal length of the second lens element, $f_5$ is the focal length of the fifth lens element, and the relation of $-13.5<f_5/f_2<-4.0$ is satisfied.

7. The image pick-up optical lens assembly of claim 3, wherein $R_9$ is the radius of curvature of the object-side surface of the fifth lens element, $R_{10}$ is the radius of curvature of the image-side surface of the fifth lens element, and the relation of $0.01<(R_9-R_{10})/(R_9+R_{10})<0.07$ is satisfied.

8. The image pick-up optical lens assembly of claim 2, wherein $v_1$ is the Abbe number of the first lens element, $v_2$ is the Abbe number of the second lens element, and the relation of $28<v_1-v_2<40$ is satisfied.

9. The image pick-up optical lens assembly of claim 2, wherein the first lens element is made of glass material.

10. The image pick-up optical lens assembly of claim 2, wherein the fourth lens element has a concave object-side surface and a convex image-side surface.

11. The image pick-up optical lens assembly of claim 2, wherein f is the focal length of the image pick-up optical lens assembly, $f_3$ is the focal length of the third lens element, and the relation of $0<f/f_3<0.24$ is satisfied.

12. The image pick-up optical lens assembly of claim 1, wherein f is the focal length of the image pick-up optical lens assembly, $f_3$ is the focal length of the third lens element, $f_4$ the focal length of the fourth lens element, $f_5$ is the focal length of the fifth lens element, and the relation of $|f/f_3|+|f/f_4|+|f/f_5|<0.65$ is satisfied.

13. The image pick-up optical lens assembly of claim 1, wherein f is the focal length of the image pick-up optical lens assembly, $CT_2$ is the thickness of the second lens element on the optical axis, $CT_3$ is the thickness of the third lens element on the optical axis, and the relation of $0.07<(CT_2+CT_3)/f<0.18$ is satisfied.

14. An image pick-up optical lens assembly, sequentially arranged from an object side to an image side along an optical axis, comprising:
  a first lens element with a positive refractive power, having a convex object-side surface;
  a second lens element with a negative refractive power;
  a third lens element with a positive refractive power;
  a fourth lens element with a positive refractive power, being a meniscus lens element, and at least one of the object-side and image-side surfaces being aspheric;
  a fifth lens element with a positive refractive power, having a convex object-side surface and a concave image-side surface, and at least one of the object-side and image-side surfaces being aspheric and the image-side surface of the fifth lens element having at least one inflection point;
  wherein f is the focal length of the image pick-up optical lens assembly, $f_3$ is the focal length of the third lens element, $f_4$ is the focal length of the fourth lens element, $f_5$ is the focal length of the fifth lens element, $R_3$ is the radius of curvature of the object-side surface of the second lens element, $R_4$ is the radius of curvature of the image-side surface of the second lens element, and the relations of $|f/f_3|+|f/f_4|+|f/f_5|<0.90$ and $-0.9<R_4/R_3<0.9$ are satisfied.

15. The image pick-up optical lens assembly of claim 14, wherein the second lens element has a concave image-side surface, and the fifth lens element is made of plastic material.

16. The image pick-up optical lens assembly of claim 15, wherein the fourth lens element has a concave object-side surface and a convex image-side surface.

17. The image pick-up optical lens assembly of claim 16, wherein $v_1$ is the Abbe number of the first lens element, $v_2$ is the Abbe number of the second lens element, and the relation of $28<v_1-v_2<40$ is satisfied.

18. The image pick-up optical lens assembly of claim 17, wherein f is the focal length of the image pick-up optical lens assembly, $f_3$ is the focal length of the third lens element, $f_4$ is the focal length of the fourth lens element, $f_5$ is the focal length of the fifth lens element, and the relation of $|f/f_3|+|f/f_4|+|f/f_5|<0.65$ is satisfied.

19. The image pick-up optical lens assembly of claim 17, wherein $R_3$ is the radius of curvature of the object-side surface of the second lens element, $R_4$ is the radius of curvature of the image-side surface of the second lens element, and the relation of $-0.5<R_4/R_3<0.5$ is satisfied.

20. The image pick-up optical lens assembly of claim 17, wherein $f_2$ is the focal length of the second lens element, $f_5$ is the focal length of the fifth lens element, and the relation of $-13.5<f_5/f_2<-4.0$ is satisfied.

21. The image pick-up optical lens assembly of claim 17, wherein $R_9$ is the radius of curvature of the object-side surface of the fifth lens element, $R_{10}$ is the radius of curvature of the image-side surface of the fifth lens element, and the relation of $0.01<(R_9-R_{10})/(R_9+R_{10})<0.07$ is satisfied.

22. The image pick-up optical lens assembly of claim 17, wherein f is the focal length of the image pick-up optical lens assembly, $CT_2$ is the thickness of the second lens element on the optical axis, $CT_3$ is the thickness of the third lens element on the optical axis, and the relation of $0.07<(CT_2+CT_3)/f<0.18$ is satisfied.

23. The image pick-up optical lens assembly of claim 16, wherein the first lens element is made of glass material.

24. The image pick-up optical lens assembly of claim 16, wherein f is the focal length of the image pick-up optical lens assembly, $f_3$ is the focal length of the third lens element, and the relation of $0<f/f_3<0.24$ is satisfied.

* * * * *